US012198041B2

United States Patent
Huynh et al.

(10) Patent No.: US 12,198,041 B2
(45) Date of Patent: Jan. 14, 2025

(54) EFFICIENT UTILIZATION OF PROCESSING ELEMENT ARRAY

(71) Applicant: Amazon Technologies, Inc., Seattle, WA (US)

(72) Inventors: Jeffrey T. Huynh, San Jose, CA (US); Ron Diamant, Santa Clara, CA (US); Hongbin Zheng, San Jose, CA (US); Yizhi Liu, Fremont, CA (US); Animesh Jain, Sunnyvale, CA (US); Yida Wang, Palo Alto, CA (US); Vinod Sharma, Menlo Park, CA (US); Richard John Heaton, San Jose, CA (US); Randy Renfu Huang, Morgan Hill, CA (US); Sundeep Amirineni, Cedar Park, TX (US); Drazen Borkovic, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/352,768

(22) Filed: Jul. 14, 2023

(65) Prior Publication Data

US 2023/0359876 A1 Nov. 9, 2023

Related U.S. Application Data

(63) Continuation of application No. 16/698,461, filed on Nov. 27, 2019, now Pat. No. 11,741,350.

(51) Int. Cl.
*G06N 3/063* (2023.01)
*G06N 3/04* (2023.01)
(Continued)

(52) U.S. Cl.
CPC .............. *G06N 3/063* (2013.01); *G06N 3/04* (2013.01)

(58) Field of Classification Search
CPC .............. G06N 3/04; G06N 3/08; H04L 29/06
See application file for complete search history.

(56) References Cited

U.S. PATENT DOCUMENTS

| 5,402,369 A | 3/1995 | Main |
| 6,101,551 A | 8/2000 | Kanoh |

(Continued)

FOREIGN PATENT DOCUMENTS

WO WO-2016186826 A1 11/2016

OTHER PUBLICATIONS

Chen, Q., et al., "Smilodon: An Efficient Accelerator for Low Bit-Width CNNs with Task Partitioning", IEEE International Symposium on Circuits and Systems (ISCAS), IEEE, May 26, 2019, pp. 1-5 [DOI: 10.1109/ISCAS.2019.8702547].

(Continued)

*Primary Examiner* — Getente A Yimer
(74) *Attorney, Agent, or Firm* — Weaver Austin Villeneuve & Sampson LLP

(57) ABSTRACT

Generating instructions for programming a processing element array to implement a convolution operation can include determining that the convolution operation under-utilizes the processing element array. The convolution operation involves using the processing element array to perform a series of matrix multiplications between a set of filters and a set of input matrices. Each filter comprises a weight matrix. Each input matrix is assigned to a respective row in the processing element array. Under-utilization can be determined through detecting that less than a threshold number of rows would be used concurrently. In response to determining that the convolution operation under-utilizes the processing element array, instructions can be added for modifying the convolution operation to increase the number of rows used concurrently. The added instructions are (Continued)

executable to cause at least one input matrix to be processed in parallel across more rows compared to processing without modifying the convolution operation.

20 Claims, 20 Drawing Sheets

(51) Int. Cl.
*G06N 3/045* (2023.01)
*G06N 3/08* (2023.01)

(56) References Cited

U.S. PATENT DOCUMENTS

| | | | |
|---|---|---|---|
| 6,654,730 | B1 | 11/2003 | Kato et al. |
| 8,407,377 | B1 | 3/2013 | Shapiro et al. |
| 9,619,423 | B1 | 4/2017 | Perry |
| 9,691,019 | B1 | 6/2017 | Gulland et al. |
| 10,445,638 | B1 | 10/2019 | Amirineni et al. |
| 10,613,977 | B1 | 4/2020 | Diamant et al. |
| 10,831,693 | B1 | 11/2020 | Huang et al. |
| 10,872,292 | B1 | 12/2020 | Yang et al. |
| 11,146,283 | B2 * | 10/2021 | Ovsiannikov ......... G06F 9/3818 |
| 11,200,487 | B1 | 12/2021 | Grundmann et al. |
| 11,741,350 | B2 | 8/2023 | Huynh et al. |
| 2003/0012180 | A1 | 1/2003 | Donahue et al. |
| 2004/0088376 | A1 | 5/2004 | McCanne et al. |
| 2004/0158543 | A1 | 8/2004 | Salam et al. |
| 2004/0186945 | A1 | 9/2004 | Jeter, Jr. et al. |
| 2005/0007969 | A1 | 1/2005 | Hundscheidt et al. |
| 2006/0088014 | A1 | 4/2006 | Ganesh |
| 2006/0239290 | A1 | 10/2006 | Lin et al. |
| 2012/0066423 | A1 | 3/2012 | Choo et al. |
| 2012/0136913 | A1 | 5/2012 | Duong et al. |
| 2012/0197965 | A1 | 8/2012 | McCanne et al. |
| 2013/0086320 | A1 | 4/2013 | Black et al. |
| 2016/0284347 | A1 * | 9/2016 | Sainath ................... G10L 15/16 |
| 2016/0342329 | A1 | 11/2016 | Shapiro et al. |
| 2017/0185327 | A1 | 6/2017 | Powell |
| 2017/0235515 | A1 | 8/2017 | Lea et al. |
| 2017/0336989 | A1 | 11/2017 | Zawodny et al. |
| 2017/0337468 | A1 | 11/2017 | Bruestle et al. |
| 2018/0150741 | A1 * | 5/2018 | Levi ....................... G06N 3/048 |
| 2019/0005375 | A1 * | 1/2019 | Mody ...................... G06N 3/04 |
| 2019/0164037 | A1 | 5/2019 | Kim et al. |
| 2019/0324759 | A1 | 10/2019 | Yang et al. |
| 2019/0325305 | A1 | 10/2019 | Zhang et al. |
| 2019/0340491 | A1 | 11/2019 | Norden et al. |
| 2021/0019593 | A1 | 1/2021 | Lin et al. |
| 2021/0056396 | A1 * | 2/2021 | Majnemer ............... G06F 17/16 |
| 2021/0086370 | A1 | 3/2021 | Zhang et al. |

OTHER PUBLICATIONS

International Search Report and Written Opinion dated Mar. 10, 2021, in Application No. PCT/US2020/070787.

U.S. Non-Final Office Action dated Dec. 8, 2022 in U.S. Appl. No. 16/698,461.

U.S. Notice of Allowance dated Apr. 14, 2023 in U.S. Appl. No. 16/698,461.

* cited by examiner

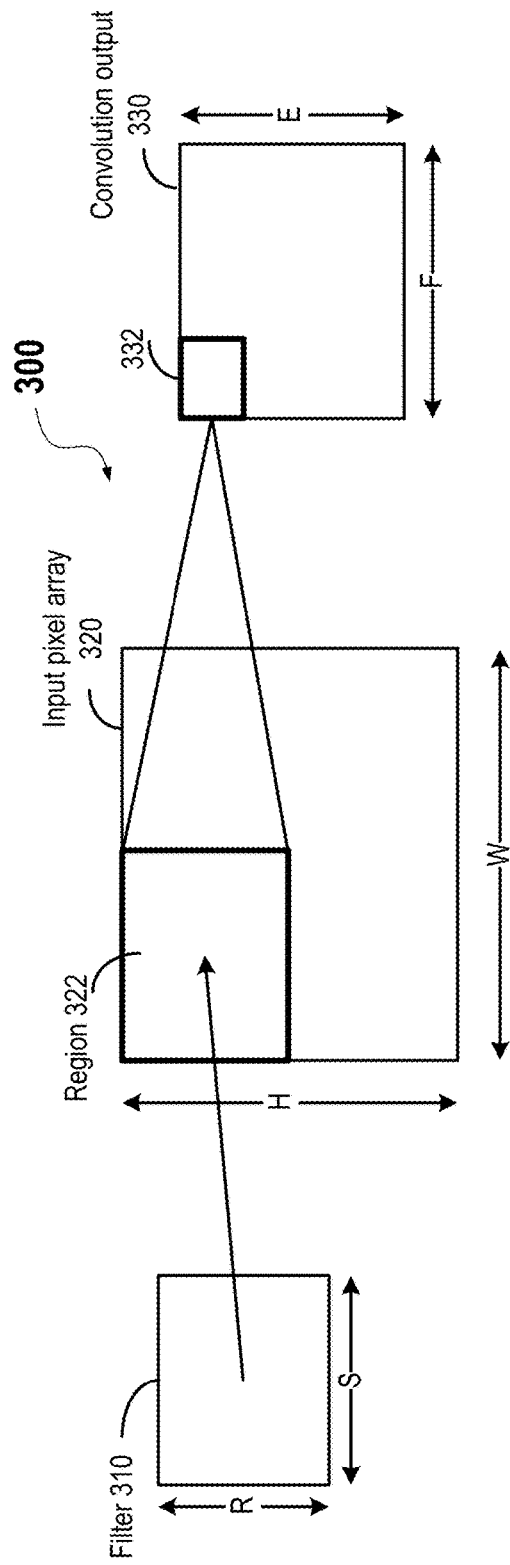
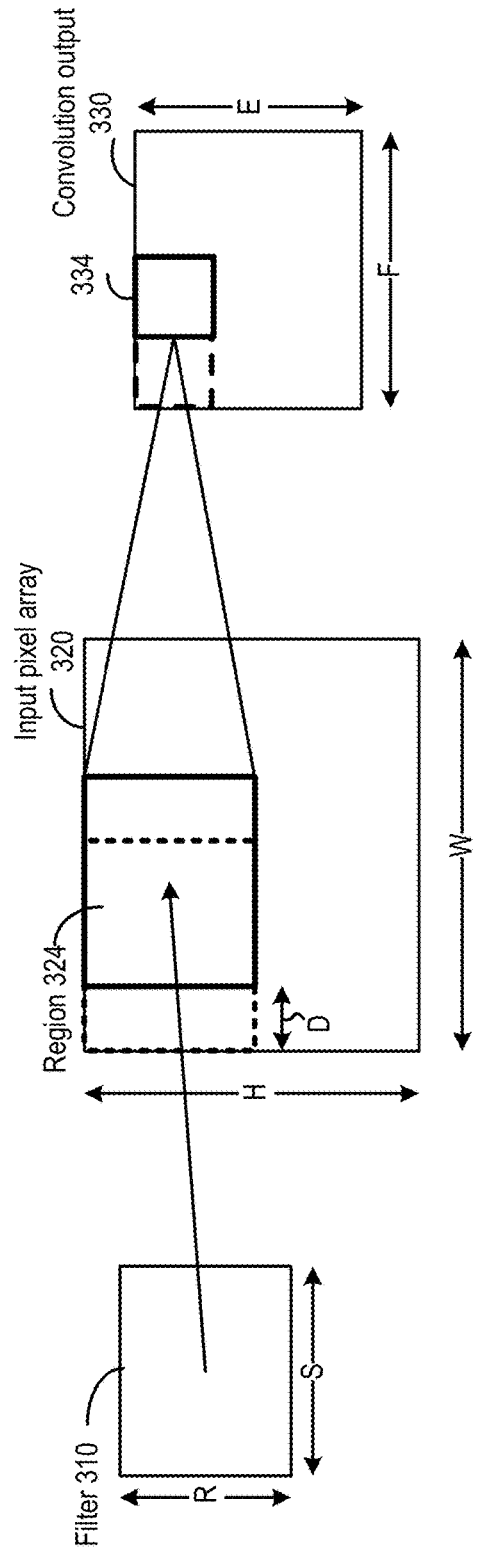
FIG. 3A
FIG. 3B

| Row | Channel | Input | | | | Sub-wave (116 elements) 112 elements → | | | | | | | | | | | | Weights | Read From Memory |
|---|---|---|---|---|---|---|---|---|---|---|---|---|---|---|---|---|---|---|---|
| 0 | 1 | 466 | 464 | 222 | 220 | ... | 10 | 8 | 6 | 4 | 2 | 0 | | | | | | [0,0] | Y |
| 1 | 2 | 466 | 464 | 222 | 220 | ... | 10 | 8 | 6 | 4 | 2 | 0 | | | | | | [0,0] | Y |
| 2 | 3 | 466 | 464 | 222 | 220 | ... | 10 | 8 | 6 | 4 | 2 | 0 | | | | | | [0,0] | Y |
| 3 | 1 | 467 | 465 | 223 | 221 | ... | 11 | 9 | 7 | 5 | 3 | 1 | | | | | | [0,1] | Y |
| 4 | 2 | 467 | 465 | 223 | 221 | ... | 11 | 9 | 7 | 5 | 3 | 1 | | | | | | [0,1] | Y |
| 5 | 3 | 467 | 465 | 223 | 221 | ... | 11 | 9 | 7 | 5 | 3 | 1 | | | | | | [0,1] | Y |
| 6 | 1 | 468 | 466 | 224 | 222 | ... | 12 | 10 | 8 | 6 | 4 | 2 | | | | | | [0,2] | N |
| 7 | 2 | 468 | 466 | 224 | 222 | ... | 12 | 10 | 8 | 6 | 4 | 2 | | | | | | [0,2] | N |
| 8 | 3 | 468 | 466 | 224 | 222 | ... | 12 | 10 | 8 | 6 | 4 | 2 | | | | | | [0,2] | N |
| 9 | 1 | 469 | 467 | 225 | 223 | ... | 13 | 11 | 9 | 7 | 5 | 3 | | | | | | [0,3] | N |
| 10 | 2 | 469 | 467 | 225 | 223 | ... | 13 | 11 | 9 | 7 | 5 | 3 | | | | | | [0,3] | N |
| 11 | 3 | 469 | 467 | 225 | 223 | ... | 13 | 11 | 9 | 7 | 5 | 3 | | | | | | [0,3] | N |
| 12 | 1 | 470 | 468 | 226 | 224 | ... | 14 | 12 | 10 | 8 | 6 | 4 | | | | | | [0,4] | N |
| 13 | 2 | 470 | 468 | 226 | 224 | ... | 14 | 12 | 10 | 8 | 6 | 4 | | | | | | [0,4] | N |
| 14 | 3 | 470 | 468 | 226 | 224 | ... | 14 | 12 | 10 | 8 | 6 | 4 | | | | | | [0,4] | N |
| 15 | 1 | 471 | 469 | 227 | 225 | ... | 15 | 13 | 11 | 9 | 7 | 5 | | | | | | [0,5] | N |
| 16 | 2 | 471 | 469 | 227 | 225 | ... | 15 | 13 | 11 | 9 | 7 | 5 | | | | | | [0,5] | N |
| 17 | 3 | 471 | 469 | 227 | 225 | ... | 15 | 13 | 11 | 9 | 7 | 5 | | | | | | [0,5] | N |
| 18 | 1 | 472 | 470 | 228 | 226 | ... | 16 | 14 | 12 | 10 | 8 | 6 | | | | | | [0,6] | N |
| 19 | 2 | 472 | 470 | 228 | 226 | ... | 16 | 14 | 12 | 10 | 8 | 6 | | | | | | [0,6] | N |
| 20 | 3 | 472 | 470 | 228 | 226 | ... | 16 | 14 | 12 | 10 | 8 | 6 | | | | | | [0,6] | N |

EFFICIENT UTILIZATION OF PROCESSING ELEMENT ARRAY

CROSS-REFERENCE TO RELATED APPLICATIONS

This application is a continuation of U.S. patent application Ser. No. 16/698,461, filed Nov. 27, 2019, issued as U.S. Pat. No. 11,741,350 on Aug. 29, 2023, and titled "EFFICIENT UTILIZATION OF PROCESSING ELEMENT ARRAY," the content of which is incorporated herein by reference in its entirety.

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network may include multiple layers of processing nodes. Each processing node on a layer can perform computations on input data generated by processing nodes on the preceding layer to generate output data. For example, a processing node may perform a set of arithmetic operations such as multiplications and additions to generate an intermediate output, or perform post-processing operations on the intermediate output. The size of the data used in each layer, such as the dimensions of input data for each input channel, the number of input channels, the number of weights to be applied to the input data, and the like, may vary from layer to layer. Thus, the number of operations (e.g., matrix multiplications) and the sizes of the data used for each operation performed at each layer may vary from layer to layer.

BRIEF DESCRIPTION OF THE DRAWINGS

Various embodiments in accordance with the present disclosure will be described with reference to the drawings, in which:

FIGS. 3A and 3B illustrate convolution operations performed on an input pixel array by an example of a convolution layer in a convolutional neural network;

FIGS. 4A-4E illustrate examples of convolution, non-linear activation, and pooling operations performed on an example of input pixel data;

FIG. 13 illustrates an example of a padded input feature map for a convolution operation according to certain embodiments;

FIG. 14 illustrates an example of loading a first set of filter elements in a processing element array, and sharing a first set of data in the input feature map of FIG. 13 among rows of the processing element array for parallel processing using the loaded filter elements according to certain embodiments;

FIG. 16 illustrates an example of partitioning data in the input feature map of FIG. 13 into multiple smaller feature maps for smaller sized matrix multiplications using a processing element array according to certain embodiments;

DETAILED DESCRIPTION

Figure 1:
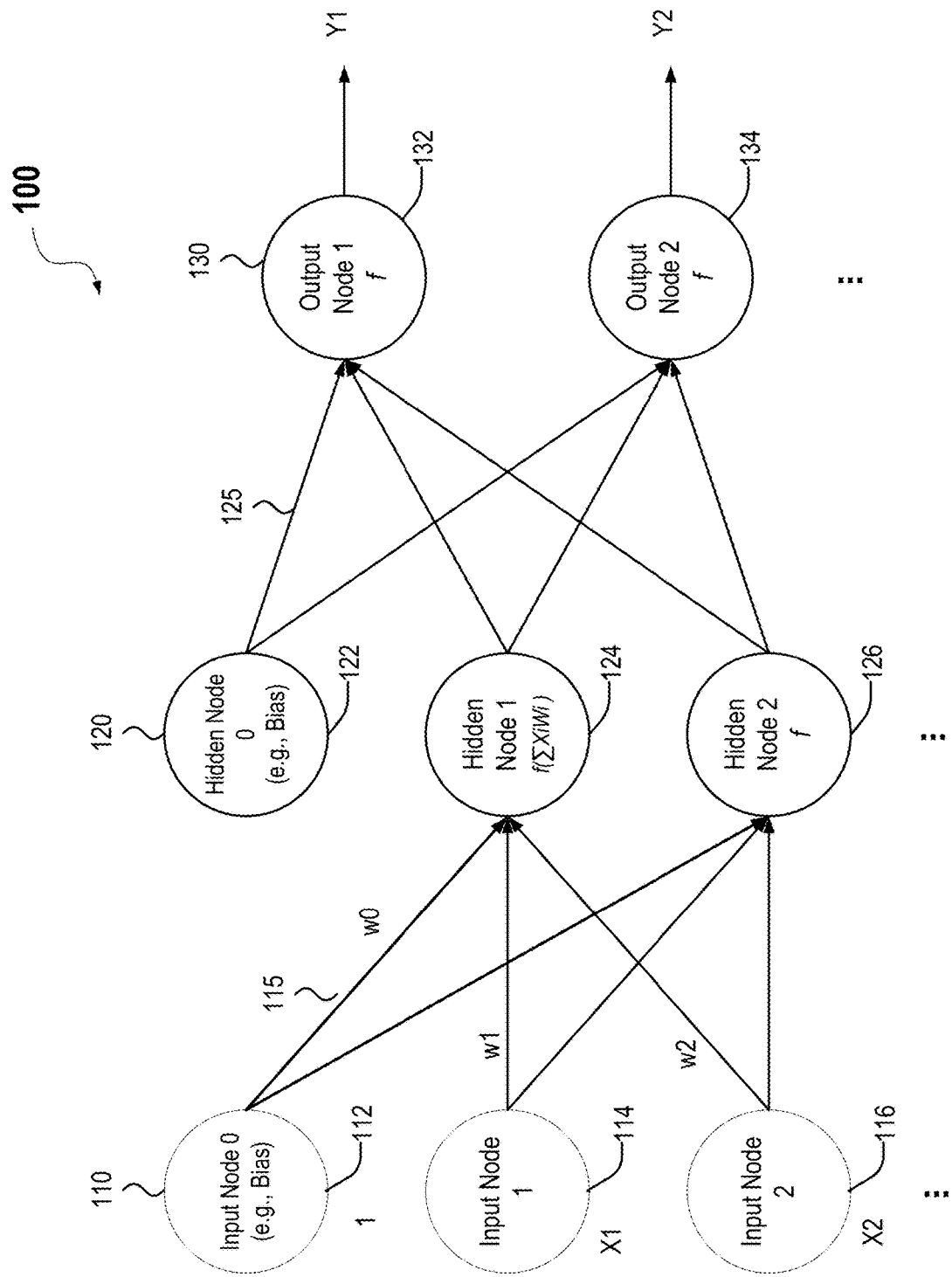
FIG. 1 illustrates an example of a multi-layer artificial neural network.

Techniques disclosed herein relate generally to artificial neural networks, and more specifically, to more efficiently utilizing a processing element array to implement an artificial neural network while reducing data transferring from memory. An artificial neural network may generally include multiple processing nodes arranged on two or more layers, where processing nodes on one layer may connect to processing nodes on another layer. Each processing node on a layer may receive a stream of input data elements, multiply each input data element with a weight, compute a weighted sum of the input data elements, and forward the weighted sum to the next layer. The size of the data used in each layer, such as the dimensions of input data for each channel, the number of channels, the number of filters to be applied to the input data, the dimension of each filter, and the like, may vary from layer to layer. For example, in many neural networks, as the network gets deeper, the number of channels may increase, while the size of each channel may reduce. Thus, the number of arithmetic operations (e.g., matrix multiplications) performed and the sizes of the data used for each arithmetic operation at each layer may vary from layer to layer. The underlying hardware for implementing the neural network, such as a graphic processing unit (GPU) or a processing element array, may generally have a certain number of processing elements (e.g., pre-configured numbers of columns and/or rows) and limited memory space and/or bandwidth. Thus, for certain layers, the same underlying hardware may not be fully utilized to efficiently perform the arithmetic operations. For example, the number of input channels in the first layer of a ResNet-50 network may be three, while the number of rows in a processing element array may be much larger, such as, for example, 128. Thus, the utilization rate of the processing element array may be less than, for example, 3%.

According to certain embodiments, a compiler may compile a neural network model to generate instructions for more efficiently utilizing a processing element (PE) array for a convolution operation that uses a small number of input channels. The compiler may generate instructions for loading multiple filter elements of a filter into multiple rows of the PE array, and replicating data in an input feature map for use by the multiple rows to apply the multiple filter elements on the input feature map at the same time. In some embodiments, the compilation may be performed at both a graph level and a tensor level. At the graph level, the compiler may identify a convolution operation that may not efficiently utilize the PE array, and add to the neural network model operations for padding an input feature map used by the convolution operation, dividing the padded input feature map into smaller partitions, dividing the convolution operation into multiple smaller convolutions that operate on the smaller partitions, and discarding certain padding data, based on, for example, the stride of the convolution. At the tensor level, the compiler may generate instructions for loading multiple filter elements of a filter into multiple rows of the PE array, replicating input data read from a memory for use by the multiple rows, and discarding results generated using certain padding data.

Techniques disclosed herein may improve the utilization rate of a hardware system for implementing a neural network that may include convolution operations using a small number of input channels. Techniques disclosed herein may also reduce the memory space and the memory bandwidth used to store or transfer the input data used by the multiple rows of the PE array. In addition, techniques disclosed herein can automatically, based on the neural network model and the hardware system, identify operations that may under-utilize the hardware system (e.g., the PE array), divide such an operation into multiple sub-operations that may be performed in parallel by the PE array, divide the input data into partitions for use by the sub-operations, and generate instructions for efficient execution by the hardware system to implement the neural network.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Artificial neural networks (also referred to as "neural networks") have been used in machine learning research and industrial applications and have achieved many breakthrough results in, for example, image recognition, speech recognition, computer vision, text processing, and the like. An artificial neural network may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer. An artificial neural network, such as a convolutional neural network, may include thousands or more of processing nodes and millions or more of weights and input data elements.

FIG. 1 illustrates an example of a multi-layer neural network 100. Multi-layer neural network 100 may include an input layer 110, a hidden (or intermediate) layer 120, and an output layer 130. In many implementations, multi-layer neural network 100 may include two or more hidden layers and may be referred to as a deep neural network. A neural network with a single hidden layer may generally be sufficient to model any continuous function. However, such a network may need an exponentially larger number of nodes when compared to a neural network with multiple hidden layers. It has been shown that a deeper neural network can be trained to perform much better than a comparatively shallow network.

Input layer 110 may include a plurality of input nodes (e.g., nodes 112, 114, and 116) that may provide information (e.g., input data) from the outside world to the network. The input nodes may pass on the information to the next layer, and no computation may be performed by the input nodes. Hidden layer 120 may include a plurality of nodes, such as nodes 122, 124, and 126. The nodes in the hidden layer may have no direct connection with the outside world (hence the name "hidden"). They may perform computations and transfer information from the input nodes to the next layers (e.g., another hidden layer or output layer 130). While a feedforward neural network may have a single input layer and a single output layer, it may have zero or multiple hidden layers. Output layer 130 may include a plurality of output nodes that are responsible for computing and transferring information from the network to the outside world, such as recognizing certain objects or activities, or determining a condition or an action.

As shown in FIG. 1, in a feedforward neural network, a node (except the bias node if any) may have connections to all nodes (except the bias node if any) in the immediately preceding layer and the immediate next layer. Thus, the layers may be referred to as fully-connected layers. All connections between nodes may have weights associated with them, even though only some of these weights are shown in FIG. 1. For a complex network, there may be hundreds or thousands of nodes and thousands or millions of connections between the nodes.

As described above, a feedforward neural network may include zero (referred to as a single layer perceptron), or one or more hidden layers (referred to as a multi-layer perceptron (MLP)). Even though FIG. 1 only shows a single hidden layer in the multi-layer perceptron, a multi-layer perceptron may include one or more hidden layers (in addition to one input layer and one output layer). A feedforward neural network with many hidden layers may be referred to as a deep neural network. While a single layer perceptron may only learn linear functions, a multi-layer perceptron can learn non-linear functions.

In the example shown in FIG. 1, node 112 may be a bias node having a value of 1 or may be a regular input node. Nodes 114 and 116 may take external inputs X1 and X2, which may be numerical values depending upon the input dataset. As discussed above, no computation is performed on input layer 110, and thus the outputs from nodes 112, 114, and 116 on input layer 110 are 1, X1, and X2, respectively, which are fed into hidden layer 120.

In the example shown in FIG. 1, node 122 may be a bias node having a value of 1 or may be a regular network node. The outputs of nodes 124 and 126 in hidden layer 120 may depend on the outputs from input layer 110 (e.g., 1, X1, X2, etc.) and weights associated with connections 115. For example, node 124 may take numerical inputs X1 and X2 and may have weights w1 and w2 associated with those inputs. Additionally, node 124 may have another input (referred to as a bias), such as 1, with a weight w0 associated with it. The main function of the bias is to provide every node with a trainable constant value (in addition to the normal inputs that the node receives). The bias value may allow one to shift the activation function to the left or right. It is noted that even though only three inputs to node 124 are shown in FIG. 1, in various implementations, a node may include tens, hundreds, thousands, or more inputs and associated weights.

The output Y from node 124 may be computed by:

$$Y = f(w1 \times X1 + w2 \times X2 + w0 \times bias), \quad (1)$$

where function $f$ may be a non-linear function that is often referred to as an activation function. When a node has K inputs, the output from the node may be computed by:

$$Y = f(\Sigma_{i=0}^{K} w_i X_i). \quad (2)$$

Thus, the computation on each neural network layer may be described as a multiplication of an input matrix and a weight matrix and an activation function applied on the products of the matrix multiplication. The outputs from the nodes on an intermediate layer may then be fed to nodes on the next layer, such as output layer 130.

The activation function may introduce non-linearity into the output of a neural network node. One example of the activation function is the sigmoid function $\sigma(x)$, which takes a real-valued input and transforms it into a value between 0 and 1. Another example of the activation function is the tan h function, which takes a real-valued input and transforms it into a value within the range of [−1, 1]. A third example of the activation function is the rectified linear unit (ReLU) function, which takes a real-valued input and thresholds it above zero (e.g., replacing negative values with zero). Another example activation function is the leaky ReLU function.

Output layer 130 in the example shown in FIG. 1 may include nodes 132 and 134, which may take inputs from hidden layer 120 and perform similar computations as the hidden nodes using weights associated with connections 125. The calculation results (Y1 and Y2) are the outputs of the multi-layer perceptron. In some implementations, in an MLP for classification, a Softmax function may be used as the activation function in the output layer. The Softmax function may take a vector of real-valued scores and map it to a vector of values between zero and one that sum to one, for example, for object classification.

As described above, the connections between nodes of adjacent layers in an artificial neural network have weights associated with them, where the weights may determine what the output vector is for a given input vector. A learning or training process may assign appropriate weights for these connections. In some implementations, the initial values of the weights may be randomly assigned. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

In many situations, using the feedforward neural network as described above for real-world application, such as image classification, may not be practical due to, for example, the size of the input data and the number of weights to be trained and applied. One way to overcome these issues is to use convolutional neural networks that perform convolutions using smaller convolutional filters rather than the large matrix multiplications as described above. A same filter may be used for many locations across the image when performing the convolution. Learning a set of convolutional filters (e.g., 7×7 matrices) may be much easier and faster than learning a large weight matrix for a fully-connected layer.

A Convolutional neural network (ConvNet or CNN) may perform operations including, for example, (1) convolution; (2) non-linearity (or activation) function (e.g., ReLU); (3) pooling or sub-sampling; and (4) classification. Different CNNs may have different combinations of these four main operations, as well as other additional operations. For example, a ResNet-50 network may include network layers that include mostly convolution layers and a few pooling layers, and may also perform residue-add operations for residue learning.

Figure 2:
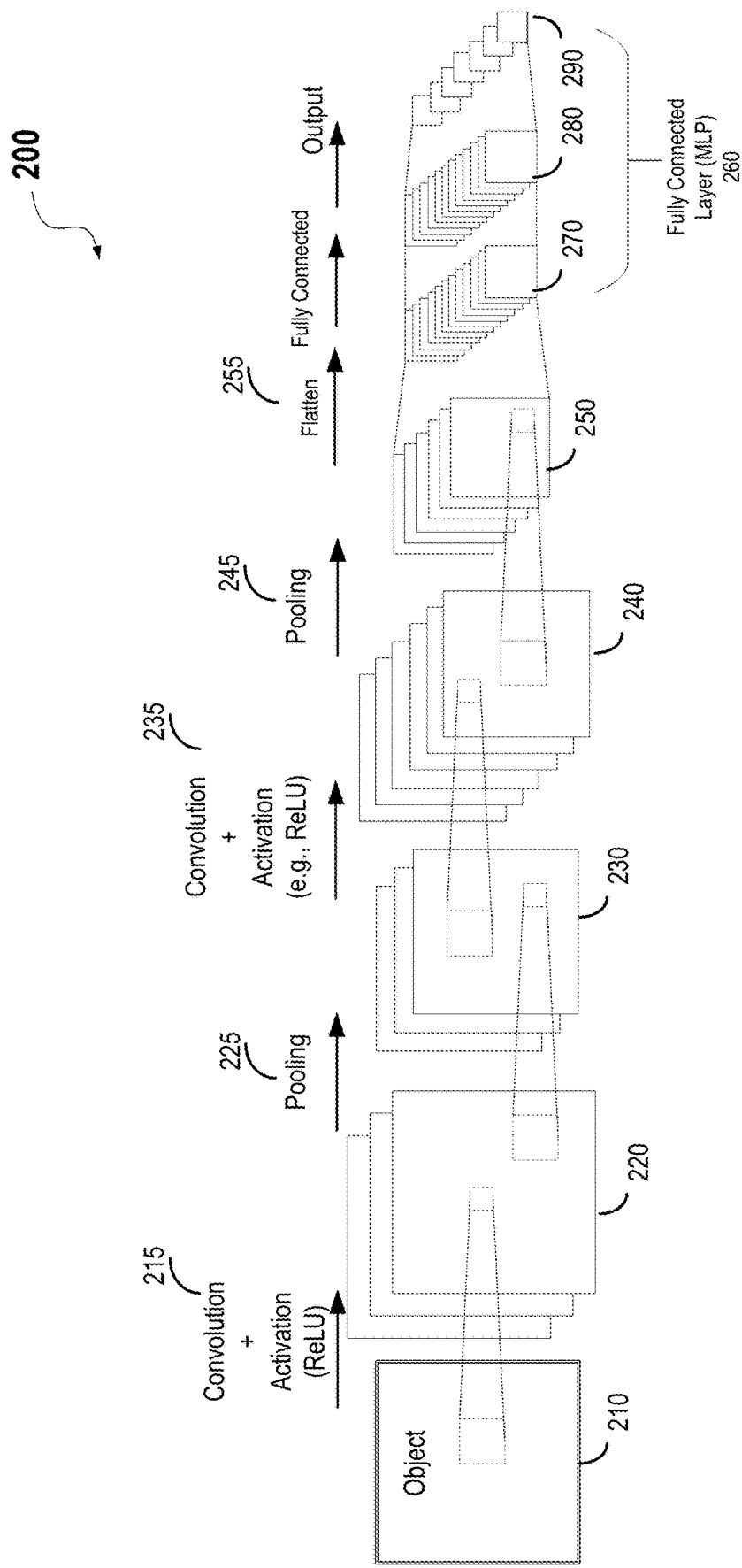
FIG. 2 illustrates an example of a convolutional neural network (CNN)

FIG. 2 illustrates an example of a convolutional neural network (CNN) 200 for image or other object classification. As described above, CNN 200 may perform four types of operations including convolution, non-linearity (or activation) function (e.g., ReLU), pooling or sub-sampling, and classification (fully-connected layer). An object 210 to be classified, such as one or more input images or other input datasets (referred to as input feature maps), may be represented by a matrix of pixel values. For example, object 210 may include multiple channels (e.g., multiple input feature maps), each channel representing a certain component of object 210. For example, an image from a digital camera may have at least a red channel, a green channel, and a blue channel, where each channel may be represented by a 2-D matrix of pixels having pixel values in the range of, for example, 0 to 255 (i.e., 8-bit). A gray-scale image may have only one channel. In the following description, the processing of a single image channel using CNN 200 is described. Other channels may be processed similarly.

As shown in FIG. 2, object 210 (e.g., input images) may first be processed by a first convolution layer 215 using a first set of filters, where first convolution layer 215 may perform a convolution between a matrix representing the input image and a matrix representing each filter in the first set of filters. The convolution may include multiple matrix multiplication. First convolution layer 215 may also perform a non-linear activation function (e.g., ReLU). An output matrix 220 from first convolution layer 215 may have smaller dimensions than the input image. First convolution layer 215 may perform convolutions on the input image using the first set of filters to generate multiple output matrices 220, which may be referred to as output feature maps of first convolution layer 215. The number of filters used may be referred to as the depth of the convolution layer. In the example shown in FIG. 2, first convolution layer 215 may have a depth of three. Each output matrix 220 (e.g., an output feature map) may be passed to a pooling layer 225, where each output matrix 220 may be subsampled or down-sampled to generate a matrix 230.

Each matrix 230 may be processed by a second convolution layer 235 using a second set of filters. A non-linear activation function (e.g., ReLU) may also be performed by the second convolution layer 235 as described above. An output matrix 240 (e.g., an output feature map) from second convolution layer 235 may have smaller dimensions than matrix 230. Second convolution layer 235 may perform convolutions on matrix 230 using the second set of filters to generate multiple output matrices 240. In the example shown in FIG. 2, second convolution layer 235 may have a depth of six. Each output matrix 240 may be passed to a pooling layer 245, where each output matrix 240 may be subsampled or down-sampled to generate an output matrix 250.

The output matrices 250 from pooling layer 245 may be flattened to vectors by a flatten layer 255, and passed through a fully-connected layer 260 (e.g., a multi-layer perceptron (MLP)). Fully-connected layer 260 may include an input layer 270 that takes the 2-D output vector from flatten layer 255. Fully-connected layer 260 may also include a hidden layer and an output layer 290. Fully-connected layer 260 may classify the object in the input image into one of several categories using feature maps or output matrix 250 and, for example, a Softmax function. The operation of the fully-connected layer may be represented by matrix multiplications. For example, if there are M nodes on input layer 270 and N nodes on hidden layer 280, and the weights of the connections between the M nodes on input layer 270 and the N nodes on hidden layer 280 can be represented by a matrix W that includes M×N elements, the output Y of hidden layer 280 may be determined by Y=X×W.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to generate a final value that represents a single element of an output matrix (e.g., a feature map). A filter may act to detect certain features from the original input image.

The convolution using one filter (or one filter set) over an input pixel array may be used to produce one feature map, and the convolution using another filter (or another filter set) over the same input pixel array may generate a different feature map. In practice, a CNN may learn the weights of the filters on its own during the training process based on some user specified parameters (which may be referred to as hyperparameters), such as the number of filters, the filter size, the architecture of the network, etc. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters (or sets of filters) used for the convolution operation. For example, in CNN 200 shown in FIG. 2, three distinct filters are used in first convolution layer 215 to perform convolution operations on the input image, thus producing three different output matrices (or feature maps) 220. Stride is the number of pixels by which the filter matrix is slid over the input pixel array. For example, when the stride is one, the filter matrix is moved by one pixel at a time. When the stride is two, the filter matrix is moved by two pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 2, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions described above, such as tan h or sigmoid function, can also be used, but ReLU has been found to perform better in many situations.

Spatial pooling (also referred to as subsampling or down-sampling) may reduce the dimensions of each feature map, while retaining the most important information. In particular, pooling may make the feature dimensions smaller and more manageable, and reduce the number of parameters and computations in the network. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

In the example shown in FIG. 2, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 200, may be similar to the training process for any feedforward neural network. First, all parameters and weights (including the weights in the filters and weights for the fully-connected layer) may be initialized with random values (or the parameters of a known neural network). Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

FIGS. 3A and 3B illustrate convolution operations performed on an input pixel array 320 using a filter 310 by a convolution layer in a convolutional neural network. Input pixel array 320 may include an input image, a channel of an input image, or a feature map generated by another convolution layer or pooling layer. FIG. 3A illustrates the convolution operation performed on a first region 322 of input pixel array 320 at a first step. FIG. 3B illustrates the convolution operation performed on a second region 324 of input pixel array 320 at a second step after sliding filter 310 by a stride.

Filter 310 may include a two-dimensional matrix, each element of the 2-D matrix representing a weight. The weights in filter 310 may be designed or trained to detect or extract certain features from the spatial distribution of pixel values in the image. The extracted features may or may not be meaningful to a human eye. Different filters may be used to detect or extract different features from the input pixel array. For example, some filters may be used to detect edges in an image, or to sharpen or blur an image. Filter 310 may have R rows (height) and S columns (width), and may typically be smaller than input pixel array 320, which may have a height of H pixels and a width of W pixels. Each weight in filter 310 may be mapped to a pixel in a region having R rows and S columns in input pixel array 320. For example, as shown in FIG. 3A, a convolution layer (e.g., first convolution layer 215 or second convolution layer 235) or a processing node of the convolution layer may receive pixel values for a region 322 (including R×S pixels) of input pixel array 320, perform element-wise multiplications between corresponding elements in filter 310 and region 322, and sum the products of the element-wise multiplications to generate a convolution output value 332. In other words, convolution output value 332 may be the sum of multiplication results between weights in filter 310 and corresponding pixels in region 322 according to $\Sigma_{i=1}^{R \times S} x_i w_i$, that is, a dot-product between a matrix W representing filter 310 and a matrix X representing pixel values of region 322.

Similarly, as shown in FIG. 3B, the convolution layer (e.g., another processing node of the convolution layer) may receive pixel values for a region 324 (including R×S pixels) of input pixel array 320, perform element-wise multiplications between corresponding elements in filter 310 and region 324, and sum the products of the element-wise multiplications to generate a convolution output value 334. As shown in FIG. 3B, the convolution operations can be performed in a sliding-window fashion in a pre-determined stride D. Stride is the number of pixels by which the filter matrix is slid over the input pixel array. For example, in the example shown in FIG. 3B, region 324 may be at a distance D (in terms of pixels) from region 322, and the next region for the next convolution operation may be situated at the same distance D from region 324. The stride D can be smaller or greater than the width S of filter 310.

The outputs of the convolution operations may form a convolution output matrix 330 with a height of E rows and a width of F columns. As described above, matrix 330 may be referred to as a feature map. The dimensions of matrix 330 may be smaller than input pixel array 320 and may be determined based on the dimensions of input pixel array 320, dimensions of filter 310, and the stride D. As described above, in some implementations, input pixel array 320 may be padded with zeros around the border so that filter 310 may be applied to bordering elements of input pixel array 320. Zero-padding may allow the control of the size of the feature map (e.g., matrix 330). When the padding size is P on each side of a 2-D input pixel array 320, the height E of matrix 330 is $$E = \frac{H - R + 2P}{D} + 1,$$

and the width F of matrix 330 is $$F = \frac{W - S + 2P}{D} + 1.$$

For example, if stride D is equal to one pixel in both horizontal and vertical directions, E may be equal to H−R+2P+1, and F may be equal to W−S+2P+1. Having a larger stride D may produce smaller feature maps.

Figures 4A, 4B, 4C, 4D, 4E:
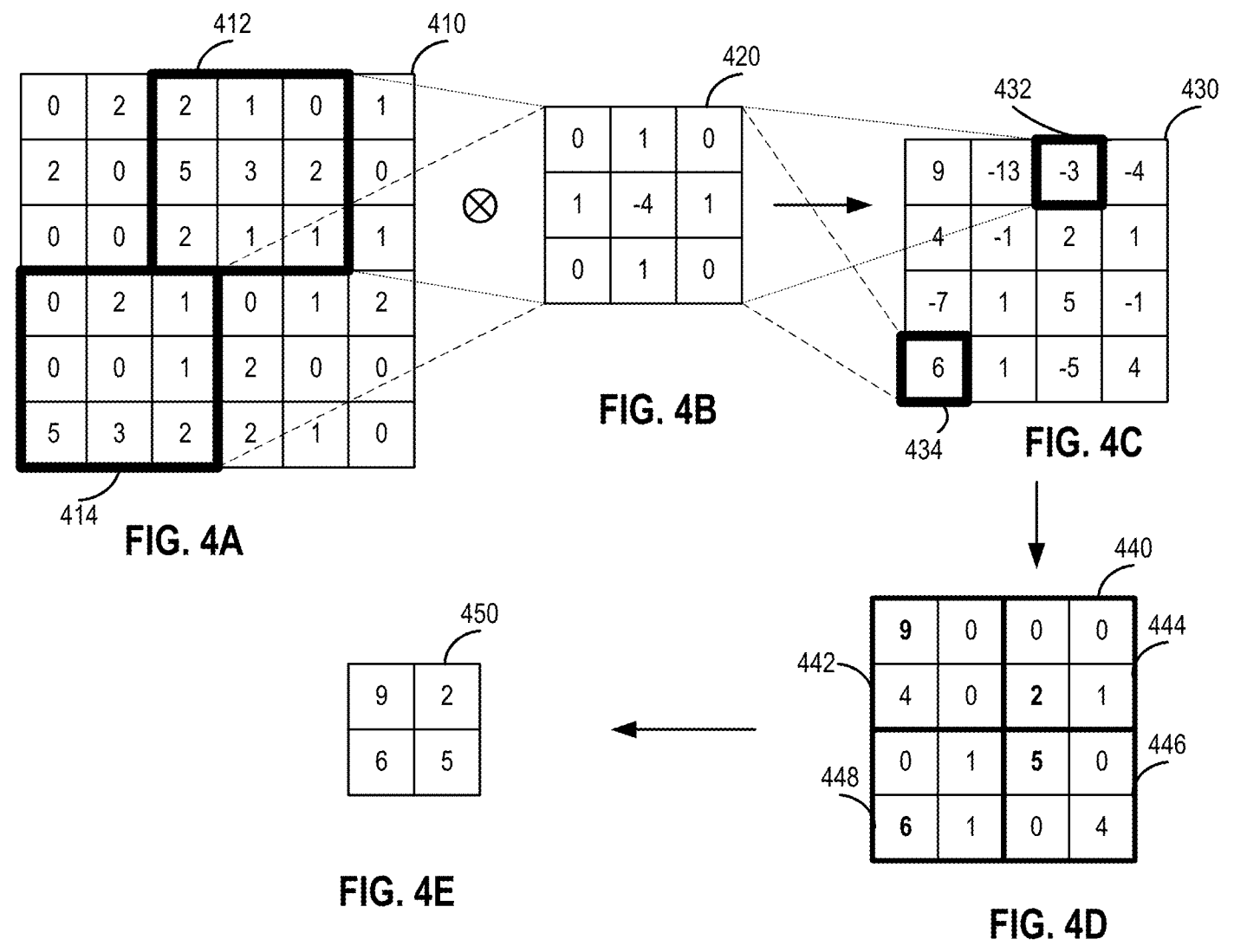

FIGS. 4A-4E illustrate examples of convolution, non-linear activation, and pooling operations performed on an example of input pixel data. The input pixel data may represent, for example, a digital image, a channel of a digital image, or a feature map generated by a previous layer in a convolutional neural network. FIG. 4A illustrates an example input matrix 410 that includes the example input pixel data. Input matrix 410 may include a 6×6 pixel array, where each element of the pixel array may include a real number, such as an integer number or a floating point number. FIG. 4B illustrates an example filter 420. Filter 420 may include a 3×3 matrix, where each element of the matrix represents a weight of the filter. Filter 420 may be used to extract certain features from input matrix 410. For example, the example filter 420 shown in FIG. 4B may be a filter for detecting edges in an image.

Input matrix 410 and filter 420 may be convoluted to generate an output matrix 430 as shown in FIG. 4C. Each element in output matrix 430 may be the sum of element-wise multiplications (e.g., dot-product) between corresponding elements in filter 420 and an overlapping region 412 of input matrix 410 and may be determined in each step a window having the same dimensions as filter 420 (e.g., 3 λ3) slides over input matrix 410 with a certain stride (e.g., 1 element horizontally and/or vertically). For example, the value of element 432 in row 1 and column 3 of output matrix 430 may be the dot-product between the matrix representing filter 420 and a matrix representing region 412 of input matrix 410, where 2×0+1×1+0×0+5×1+3×(−4)+2×1+2×0+1×1+1×0=1+5−12+2+1=−3. Similarly, the value of element 434 in row 4 and column 1 of output matrix 430 may be the dot-product between the matrix representing filter 420 and a matrix representing region 414 of input matrix 410, where 0×0+2×1+1×0+0×1+0×(−4)+1×1+5×0+3×1+2×0=2+1+3=6. For input matrix 410 with a 6×6 pixel array and filter 420 represented by a 3×3 matrix, output matrix 430 may be a 4×4 matrix when the stride used is one element or pixel.

A non-linear activation function (e.g., ReLU, sigmoid, tan h, etc.) may then be applied to output matrix 430 to generate a matrix 440 as shown in FIG. 4D. In the example shown in FIG. 4D, the ReLU function is used, and thus all negative values in output matrix 430 are replaced by 0s in matrix 440. A pooling operation (e.g., a max, average, or sum pooling operation) may be applied to matrix 440 to sub-sample or down-sample data in matrix 440. In the example shown in FIGS. 4D and 4E, a max pooling operation may be applied to matrix 440, where the 4×4 matrix 440 may be divided into four 2×2 regions 442, 444, 446, and 448. The maximum value of each region may be selected as a subsample representing each region. For example, a maximum value of 9 is selected from region 442, a maximum value of 2 is selected from region 444, a maximum value of 5 is selected from region 446, and a maximum value of 6 is selected from region 448. Thus, a feature map 450 with four elements 9, 2, 6, and 5 may be generated from the 6×6 input matrix 410 after the convolution, non-linear activation, and pooling operations.

Figure 5:
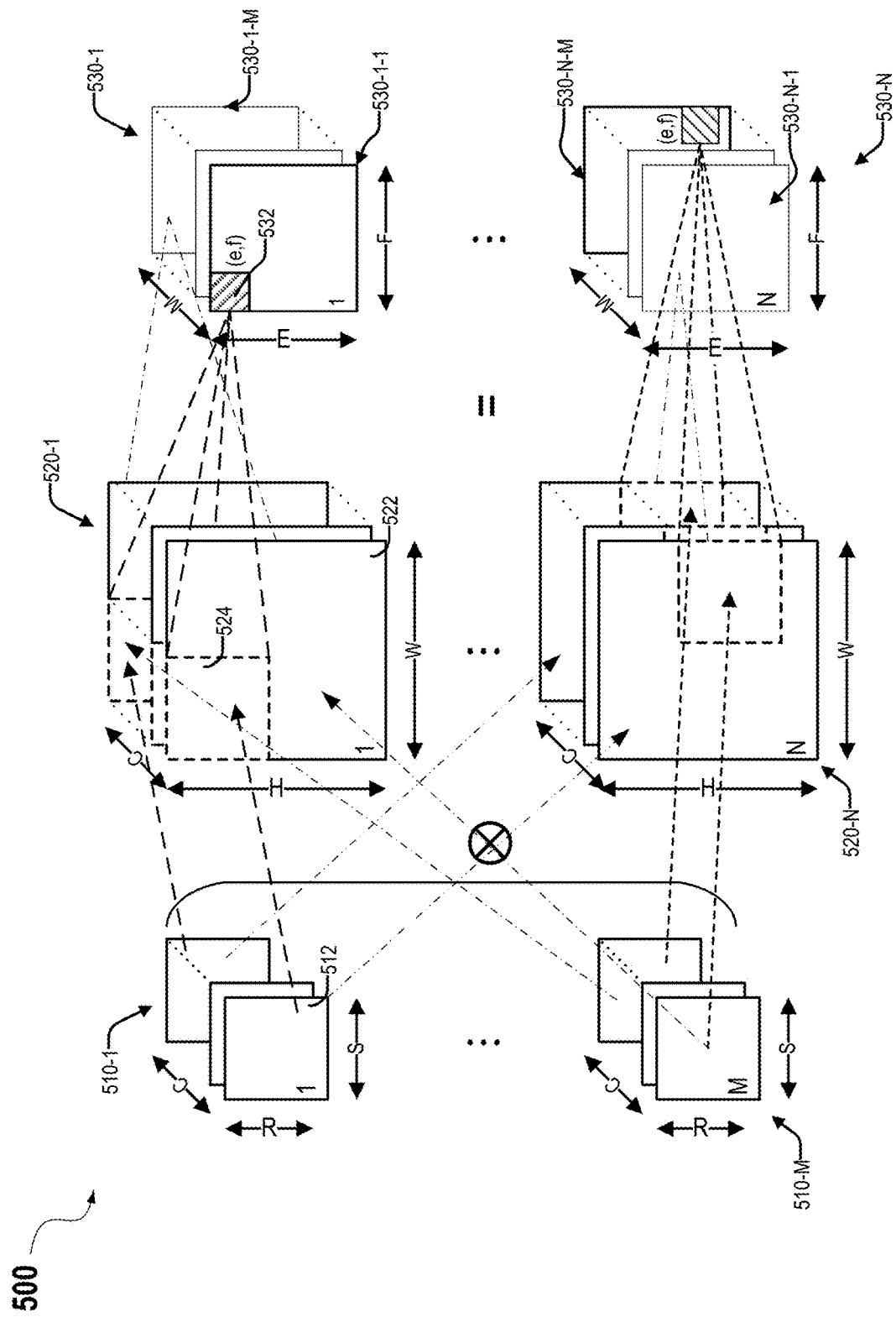
FIG. 5 illustrates an example of a model for a convolution layer of a convolutional neural network.

FIG. 5 illustrates an example of a model 500 for a convolution layer of a convolutional neural network used in, for example, image processing. As illustrated in the example, there may be multiple (e.g., N) 3-D inputs 520-1, . . . , and 520-N to the convolution layer. Each 3-D input may include C channels of 2-D input feature maps (with dimensions H×W). For the first convolution layer in a CNN, such as a ResNet-50, a 3-D input may include, for example, three channels of 2-D images, such as the red, green, and blue color channels. Multiple (e.g., M) 3-D filters 510-1, . . . , and 510-M, each having C 2-D filters of dimensions R×S, may be convolved with the N 3-D inputs 520-1, . . . , and 520-N (e.g., N batches of C input feature maps of dimensions H×W) to generate multiple (e.g., N) 3-D outputs 530-1, . . . , and 530-N, where each of the 3-D outputs 530-1, . . . , and 530-N may include M output feature maps (also referred to as output channels). Each 3-D filter 510-1, . . . , or 510-M (with dimensions C×R×S) may be applied to a 3-D input 520-1, . . . , or 520-N (with dimensions C×H×W) to generate an output feature map (with dimensions E×F as described above with respect to FIGS. 3A and 3B) in a 3-D output 530-1, . . . , or 530-N that includes M output feature maps, and thus M 3-D filters may be used to generate the M output feature maps in a 3-D output 530-1, . . . , or 530-N for a 3-D input 520-1, . . . , or 520-N. For example, 3-D filter 510-1 may be applied to 3-D input 520-1 to generate an output feature map 530-1-1, . . . and 3-D filter 510-M may be applied to 3-D input 520-1 to generate an output feature map 530-1-M. The same M 3-D filters 510-1, . . . , and 510-M can be applied to each 3-D input 520-1, . . . , or 520-N to generate each respective 3-D output 530-1, . . . , or 530-N that includes M output feature maps. For example, 3-D filter 510-1 may be applied to 3-D input 520-N to generate an output feature map 530-N-1, and 3-D filter 510-M may be applied to 3-D input 520-N to generate an output feature map 530-N-M. Thus, there are N 3-D inputs and N 3-D outputs, where each 3-D output includes M output feature maps.

More specifically, as shown in FIG. 5, for a 3-D input 520-1, . . . , or 520-N and a 3-D filter 510-1, . . . , or 510-M, the C 2-D filters (each with dimensions R×S) in a 3-D filter 510-m may correspond to the C channels of 2-D input feature maps (each with dimensions H×W) in the 3-D input, and the convolution operation between each 2-D filter of the C 2-D filters and the corresponding channel of the C channels of 2-D input feature maps may be performed. The convolution results for C pairs of 2-D filter and corresponding 2-D input feature map can be summed to generate a convolution output (e.g., a pixel) $O_{e,f}^m$ on an output feature map of index m in the M output feature maps in a 3-D output 530-1, . . . , or 530-N as follows:

$$O_{e,f}^m = \sum_{r=0}^{R-1}\sum_{s=0}^{S-1}\sum_{c=0}^{C-1} X_{eD+r,fD+s}^c \times W_{r,s}^{c,m}, \qquad (3)$$

where m corresponds to the index of the output feature map and the index of the 3-D filter in the M 3-D filters. $X_{eD+r,fD+s}^C$ is the value of a pixel with a horizontal pixel coordinate of eD+r and a vertical pixel coordinate of fD+s in an input feature map of index C in the C channels of 2-D input feature maps in a 3-D input. D is the sliding-window stride distance. e and f are the coordinates of the output pixel in the corresponding output feature map of the M output feature maps and may correspond to a particular sliding window. r and s correspond to a particular location (e.g., pixel or element) within a sliding window or a 2-D filter. $W_{r,s}^{c,m}$ is a weight corresponding to a pixel at a location (r, s) of a 2-D filter of index C in the 3-D filter of index m. Equation (3) indicates that, to compute each convolution output (e.g., pixel) $O_{e,f}^m$ at a location (e, f) on an output feature map m, each pixel $X_{eD+r,fD+s}^C$ within a sliding window in an input feature map of index C may be multiplied with a corresponding weight $W_{r,s}^{c,m}$ to generate a product, the partial sum of the products for the pixels within each sliding window in the input feature map of index C can be computed, and then a sum of the partial sums for all C input feature maps can be computed to determine the value of the pixel $O_{e,f}^m$ at a location (e, f) in the corresponding output feature map of index m in the M output feature maps.

In one example, for 3-D filter 510-1 and 3-D input 520-1, each 2-D filter 512 in the C 2-D filters in 3-D filter 510-1 may correspond to a respective input feature map 522 in 3-D input 520-1 and may be used to convolve with (e.g., filter) the corresponding input feature map 522, where each pixel in a sliding window 524 in input feature map 522 may be multiplied with a corresponding pixel in 2-D filter 512 to generate a product, and the products for all pixels in sliding window 524 may be summed to generate a partial sum. The partial sums for the C 2-D filters 512 (and corresponding input feature map 522) may be added together to generate an output pixel 532 at a location (e, f) on output feature map 530-1-1 in 3-D output 530-1. Sliding window 524 may be shifted on all C input feature maps 522 in 3-D input 520-1 based on the strides D in the two dimensions to generate another output pixel 532 at a different location on output feature map 530-1-1 in 3-D output 530-1. Sliding window 524 may be repeatedly shifted together on all C input feature maps 522 until all output pixels 532 on output feature map 530-1-1 in 3-D output 530-1 are generated.

Each 3-D filter 510-2, . . . , or 510-M may be used to convolve with 3-D input 520-1 as described above with respect to 3-D filter 510-1 to generate each respective output feature map 530-1-2, . . . , or 530-1-M in 3-D output 530-1. Similarly, each 3-D filter 510-1, . . . , or 510-M may be used to convolve with 3-D input 520-N as described above with respect to 3-D filter 510-1 and 3-D input 520-1 to generate each respective output feature map 530-N-1, . . . , or 530-N-M in 3-D output 530-N.

Figure 6:
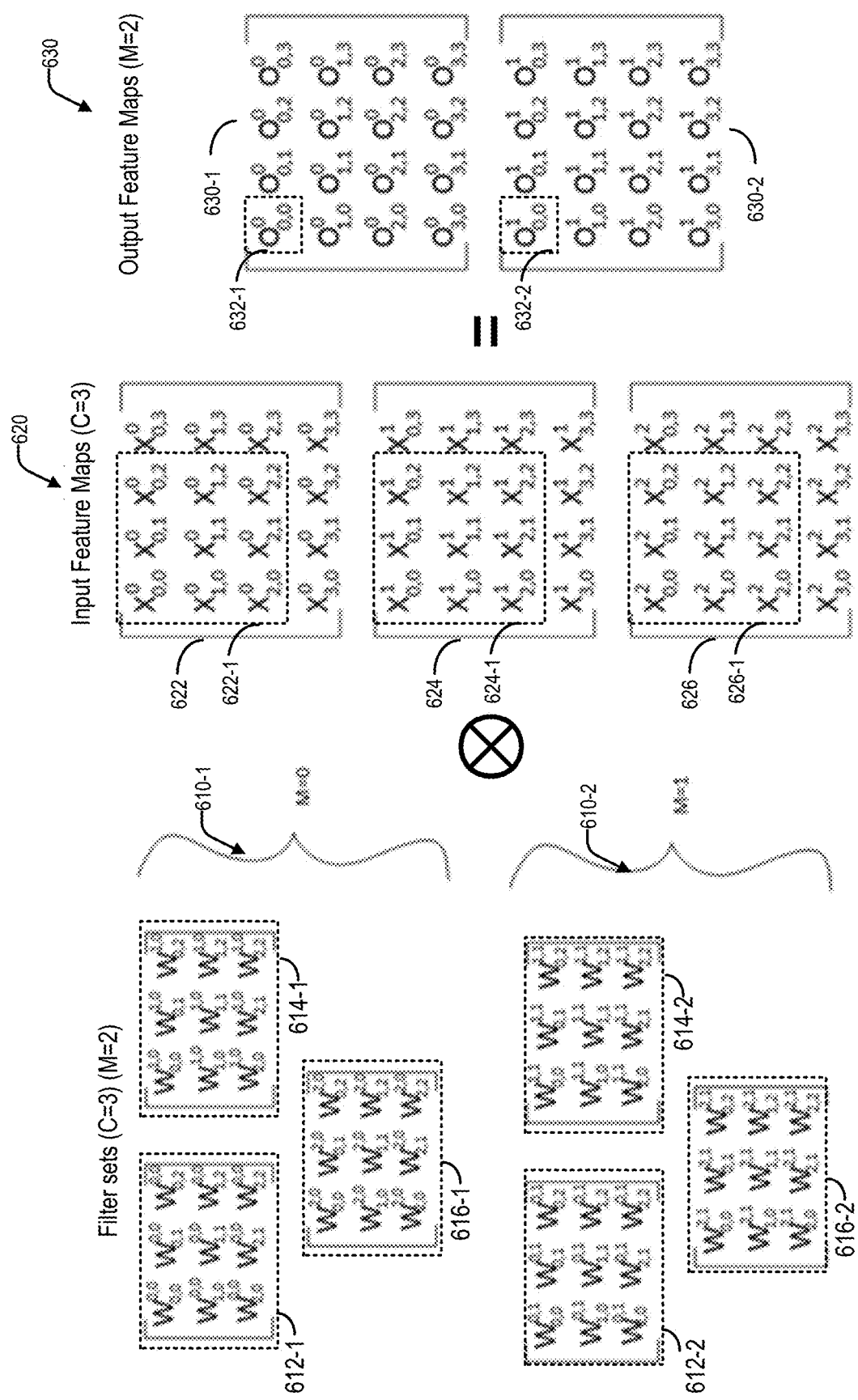
FIG. 6 illustrates an example of a convolution operation involving one batch (N=1) of C channels of input data and M sets of C filters.

FIG. 6 illustrates an example of a convolution operation involving one batch (N=1) of C channels (C=3) of input data 620 and M sets (M=2) of C filters (C=3). The example shown in FIG. 6 may be a specific example of model 500 described with respect to FIG. 5, where the number of batches N is one. As illustrated, input data 620 includes 3 input feature maps 622, 622, and 624 (e.g., input channels), each corresponding to an input channel. The filters include a first set of filters 610-1 and second set of filters 610-2, where first set of filters 610-1 may include three 2-D filters 612-1, 614-1, and 616-1 and second set of filters 610-2 may include three 2-D filters 612-2, 614-2, and 616-2.

Each 2-D filter 612-1, 614-1, or 616-1 in first set of filters 610-1 may convolve with the corresponding input feature map 622, 622, or 624, and the results of the convolutions for the three input feature maps may be added to generate an output feature map 630-1 in output feature maps 630. For example, pixels in filter 612-1 may be multiplied with corresponding pixels in window 622-1 on input feature map 622 and the products may be added to generate a first partial sum. Pixels in filter 614-1 may be multiplied with corresponding pixels in window 624-1 on input feature map 624 and the products may be added to generate a second partial sum. Pixels in filter 616-1 may be multiplied with corresponding pixels in window 626-1 on input feature map 626 and the products may be added to generate a third partial sum. The first, second, and third partial sums may be added together to generate an output pixel 632-1 on output feature map 630-1. Other output pixels on output feature map 630-1 may be generated in a same manner by shifting the windows or filters together on the input feature maps.

Similarly, each 2-D filter 612-2, 614-2, or 616-2 in second set of filters 610-2 may convolve with the corresponding input feature map 622, 622, or 624, and the results of the convolutions for the three input feature maps may be summed to generate an output feature map 630-2 in output feature maps 630. For example, pixels in filter 612-2 may be multiplied with corresponding pixels in window 622-1 on input feature map 622 and the products may be added to generate a first partial sum. Pixels in filter 614-2 may be multiplied with corresponding pixels in window 624-1 on input feature map 624 and the products may be added to generate a second partial sum. Pixels in filter 616-2 may be multiplied with corresponding pixels in window 626-1 on input feature map 626 and the products may be added to generate a third partial sum. The first, second, and third partial sums may be added together to generate an output pixel 632-2 on output feature map 630-2. Other output pixels on output feature map 630-2 may be generated in a same manner by shifting the windows or filters together on the input feature maps.

Operation of a neural network (e.g., conducting inference), as illustrated by the models discussed above, generally involves fetching input data or input activations, executing multiply-and-accumulate operations in parallel for each node in a layer, and providing output activations. Optimum performance of a neural network, measured by response time, can be achieved when a hardware architecture is capable of highly parallelized computations. Special-purpose or domain-specific neural network processors can achieve better performance than both CPUs and GPUs when executing a neural network. Neural network processors can employ a spatial architecture including a processing element (PE) array, in which the processing elements may form processing chains and can pass data directly from one processing element to another. This can significantly reduce the number of memory transactions. In some examples, the weights or inputs can be pre-loaded into the processing element array. In some examples, neural network processors can also include an on-chip buffer that can store values read from processor memory, and that can distribute values to multiple computing engines in the processor. The computing engines can further include a small, local register file (e.g., a small memory) for storing intermediate results. Having an on-chip memory hierarchy can improve the efficiency of the operation of a neural network by reducing memory latencies.

Figure 7:
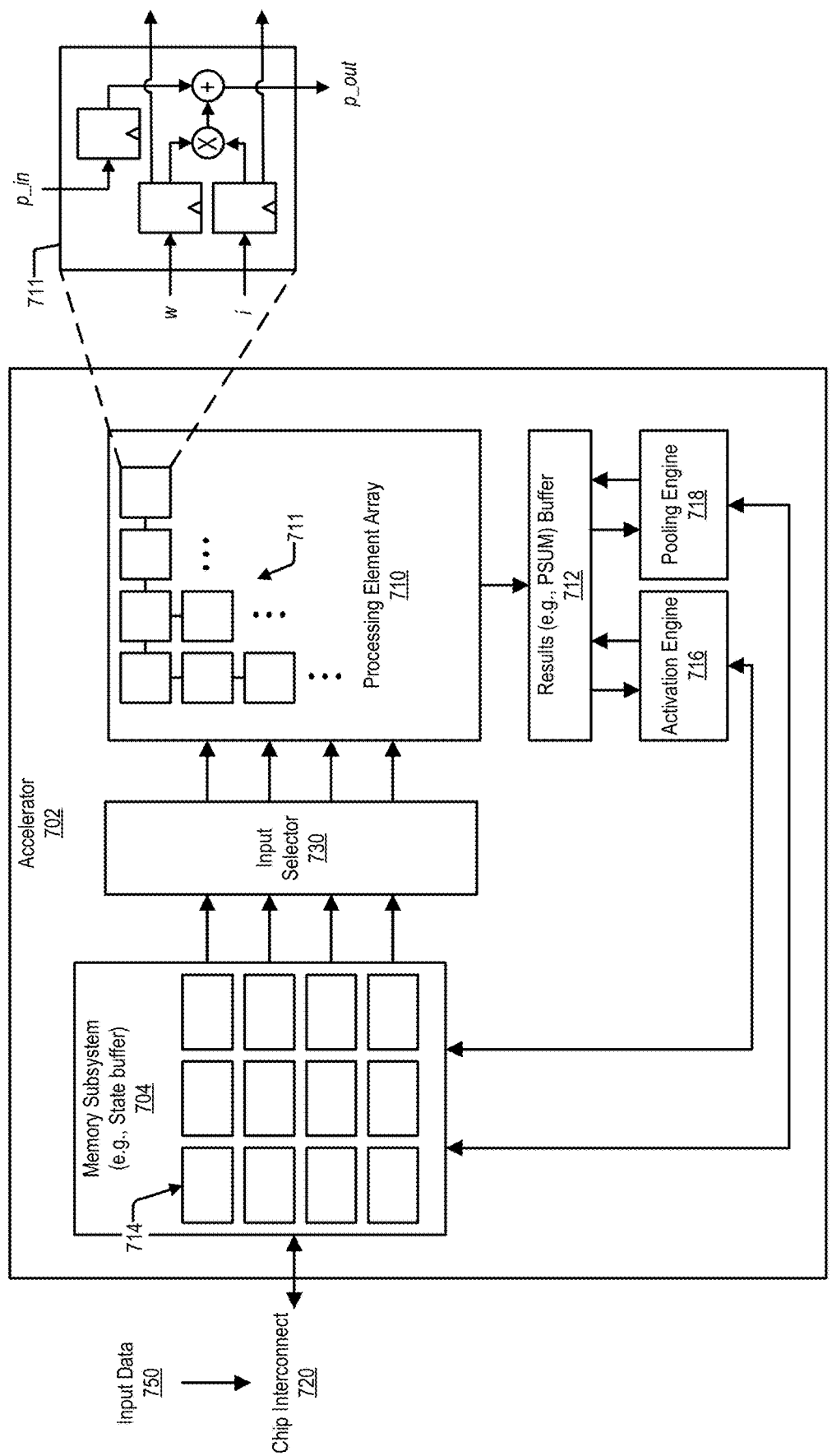
FIG. 7 is a simplified block diagram illustrating an example of an integrated circuit device for performing neural network operations according to certain embodiments.

FIG. 7 is a block diagram illustrating an example of an integrated circuit device for performing neural network operations, such as tensor operations, according to certain embodiments. The example shown in FIG. 7 includes an accelerator 702. In various examples, accelerator 702 can execute computations for a set of input data (e.g., input data 750) using a processing element array 710, an activation engine 716, and/or a pooling engine 718. In some examples, accelerator 702 may be an integrated circuit component of a processor, such as a neural network processor. The processor may have other integrated circuit components, including additional accelerator engines.

In some embodiments, accelerator 702 may include a memory subsystem 704 (e.g., state buffer) that includes multiple memory banks 714. Each memory bank 714 can be independently accessible, such that the read of one memory bank is not dependent on the read of another memory bank. Similarly, writing to one memory bank may not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 independently accessible can increase the efficiency of accelerator 702. For example, values can be simultaneously read and provided to each row of processing element array 710, so that the entire processing element array 710 can be in use in one clock cycle. As another example, memory banks 714 can be read at the same time that results computed by processing element array 710 are written to memory subsystem 704. In contrast, a single memory may be able to service only one read or write at a time. With a single memory, multiple clock cycles can be required, for example, to read input data for each row of processing element array 710 before processing element array 710 can be started.

In various implementations, memory subsystem 704 can be configured to simultaneously service multiple clients, including processing element array 710, activation engine 716, pooling engine 718, and any external clients that access memory subsystem 704 over a communication fabric 720. In some implementations, being able to service multiple clients can mean that memory subsystem 704 has at least as many memory banks as there are clients. In some cases, each row of processing element array 710 can count as a separate client. In some cases, each column of processing element array 710 can output a result, such that each column can count as a separate write client. In some cases, output from processing element array 710 can be written into memory banks 714 that can then subsequently provide input data for processing element array 710. As another example, activation engine 716 and pooling engine 718 can include multiple execution channels, each of which can be separate memory clients. Memory banks 714 can be implemented, for example, using static random access memory (SRAM).

In various implementations, memory subsystem 704 can include control logic. The control logic can, for example, keep track of the address spaces of each of memory banks 714, identify memory banks 714 to read from or write to, and/or move data between memory banks 714. In some implementations, memory banks 714 can be hardwired to particular clients. For example, a set of memory banks 714 can be hardwired to provide values to the rows of processing element array 710, with one memory bank servicing each row. As another example, a set of memory banks can be hard wired to receive values from columns of processing element array 710, with one memory bank receiving data for each column.

According to certain embodiments, accelerator 702 may include an input selector circuit 730. Input selector circuit 730 may be used to determine the data to be sent to the processing element array 710 in any given clock cycle. In some examples, input selector circuit 730 may control the data that is input into each row of processing element array 710. In some examples, input selector circuit 730 may control the data that is input into a subset of the rows. In various examples, for a given row, input selector circuit 730 may select between data that is output from the memory subsystem 704 and data that has been selected for inputting into a different row. For example, input selector circuit 730 may determine to input data from memory subsystem 704 into row 0 in processing element array 710, while for row 1 in processing element array 710, input selector circuit 730 may determine to use the data that is input into row 0 (e.g., after a delay), rather than reading the data from memory subsystem 704 again. In other words, the same data read from memory subsystem 704 may be provided to more than one row of processing element array 710. In some embodiments, input selector circuit 730 may be configured such that it may be bypassed or may not perform data duplication, and thus each row of processing element array 710 may receive data from memory subsystem 704.

Processing element array 710 is the computation matrix of accelerator 702. Processing element array 710 can, for example, execute parallel integration, convolution, correlation, and/or matrix multiplication, among other things. Processing element array 710 may include multiple processing elements 711, arranged in rows and columns, such that results output by one processing element 711 can be input directly into another processing element 711. Processing elements 711 that are not on the outside edges of processing element array 710 thus can receive data to operate on from other processing elements 711, rather than from memory subsystem 704.

In various examples, processing element array 710 uses systolic execution, in which data arrives at each processing element 711 from different directions at regular intervals. In some examples, input data can flow into processing element array 710 from the left and weight values can be loaded at the top. In some examples weights and input data can flow from the left and partial sums can flow from top to bottom. In these and other examples, a multiply-and-accumulate operation moves through processing element array 710 as a diagonal wave front, with data moving to the right and down across the array. Control signals can be input at the left at the same time as weights, and can flow across and down along with the computation.

In various implementations, the numbers of columns and rows in processing element array 710 may determine the computational capacity of processing element array 710. For example, the number of rows in processing element array 710 may determine the number of input feature maps that can be processed in parallel, and the number of columns in processing element array 710 may determine the number of filter sets that can be applied in parallel to input data. The number of rows in processing element array 710 may also determine the memory bandwidth for achieving the maximum utilization of processing element array 710. Processing element array 710 can have, for example, 64 columns and 128 rows, or some other number of columns and rows.

An example of a processing element 711 is illustrated in an inset diagram in FIG. 7. As illustrated by this example, processing element 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 711.

In the illustrated example, an input from above can include a partial sum, p_in, provided either from another processing element 711 or from a previous round of computation by processing element array 710. When starting a computation for a new set of input data, the top row of processing element array 710 can receive a fixed value for p_in, such as zero. As illustrated by this example, i and w are multiplied together and the result is summed with p_in to produce a new partial sum, p_out, which can be input into another processing element 711. Various other implementations of processing element 711 are possible.

Outputs from the last row in processing element array 710 can be temporarily stored in a results buffer 712 (e.g., partial sum (PSUM) buffer). The results can be intermediate results, which can be written to memory banks 714 to be provided to processing element array 710 for additional computation. Alternatively, the results can be final results, which, once written to memory banks 714 can be read from memory subsystem 704 over communication fabric 720, to be output by the system.

In some implementations, accelerator 702 includes an activation engine 716. In these implementations, activation engine 716 can combine the results from processing element array 710 into one or more output activations. For example, for a convolutional neural network, convolutions from multiple channels can be summed to produce an output activation for a single channel. In other examples, accumulating results from one or more columns in processing element array 710 may be needed to produce an output activation for a single node in the neural network. In some examples, activation engine 716 can be bypassed.

In various examples, activation engine 716 can include multiple separate execution channels. In these examples, the execution channels can correspond to the columns of processing element array 710, and can perform an operation on the outputs of a column, the result of which can be stored in memory subsystem 704. In these examples, activation engine 716 may be able to perform between 1 and N parallel computations, where N is equal to the number of columns in processing element array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 702 can include a pooling engine 718. Pooling is the combining of outputs of the columns of processing element array 710. Combining can include for example, computing a maximum value, a minimum value, an average value, a median value, a summation, a multiplication, or another logical or mathematical combination. In various examples, pooling engine 718 can include multiple execution channels that can operating on values from corresponding columns of processing element array 710. In these examples, pooling engine 718 may be able to perform between 1 and N parallel computations, where Nis equal to the number of columns in processing element array 710. In various examples, execution channels of pooling engine 718 can operate in parallel and/or simultaneously. In some examples, pooling engine 718 can be bypassed.

Herein, activation engine 716 and pooling engine 718 may be referred to collectively as execution engines. Processing element array 710 is another example of an execution engine. Another example of an execution engine is a Direct Memory Access (DMA) engine, which may be located outside accelerator 702.

Input data 750 can arrive over communication fabric 720. Communication fabric 720 can connect accelerator 702 to other components of a processor, such as a DMA engine that can obtain input data 750 from an Input/Output (I/O) device, a storage drive, or a network interface. Input data 750 can be, for example one-dimensional data, such as a character string or numerical sequence, or two-dimensional data, such as an array of pixel values for an image or frequency and amplitude values over time for an audio signal. In some examples, input data 750 can be three-dimensional, as may be the case with, for example, the situational information used by a self-driving car or virtual reality data. In some implementations, memory subsystem 704 can include a separate buffer for input data 750. In some implementations, input data 750 can be stored in memory banks 714 when accelerator 702 receives input data 750.

In some examples, accelerator 702 can implement a neural network processing engine. In these examples, accelerator 702, for a set of input data 750, can execute a neural network to perform a task for which the neural network was trained. Executing a neural network on a set of input data can be referred to as inference or performing inference.

The weights for the neural network can be stored in memory subsystem 704, along with input data 750 on which the neural network will operate. The neural network can also include instructions, which can program processing element array 710 to perform various computations on the weights and the input data. The instructions can also be stored in memory subsystem 704, in memory banks 714, or in a separate instruction buffer. Processing element array 710 can output intermediate results, which represent the outputs of individual layers of the neural network. In some cases, activation engine 716 and/or pooling engine 718 may be enabled for computations called for by certain layers of the neural network. Accelerator 702 can store the intermediate results in memory subsystem 704 for inputting into processing element array 710 to compute results for the next layer of the neural network. Processing element array 710 can further output final results from a last layer of the neural network. The final results can be stored in memory subsystem 704 and then be copied out to host processor memory or to another location.

In some embodiments, mapping the tensor operation described above with respect to FIGS. 5 and 6 and Equation (3) to a PE array (e.g., PE array 710) for execution may include mapping each of the M 3-D filters to a respective column of the PE array, and mapping each input feature map of the C input feature maps (e.g., C channels) in a 3-D input to a respective row of the PE array. For example, the H×W pixels in each 2-D input feature map may be flattened to form a one-dimensional vector and mapped to a row of the PE array. The C×R×S weights or pixels in each 3-D filter may be flattened to form a one-dimensional vector and mapped to a column of the PE array. Partial sums may be accumulated vertically in each column. In cases where a batch including N 3-D inputs each including C channels are processed, each row of the PE array may be mapped to N 2-D input feature maps.

As described above, movement of data, such as input pixels, filter weights, and partial sums to be accumulated, between PEs can reduce the access to the state buffers or off-chip memory. In some embodiments, the input feature map can be stationary and the weights of the filters can be shifted, which may be referred to as an "image-stationary" model. In some embodiments, a "weight-stationary" model may be used, where the weights of the filters are stationary (preloaded from a state buffer into the registers in the PE array) and the image is moving (loaded from the state buffer during computation), in order to minimize the cost of the movement of the weights. In some embodiments, the output of a PE may be stored in the register at the PE and remains stationary to minimize the cost of the movement of the partial sums, where the input feature maps and weights may move through the PE array and the state buffer.

Figure 8:
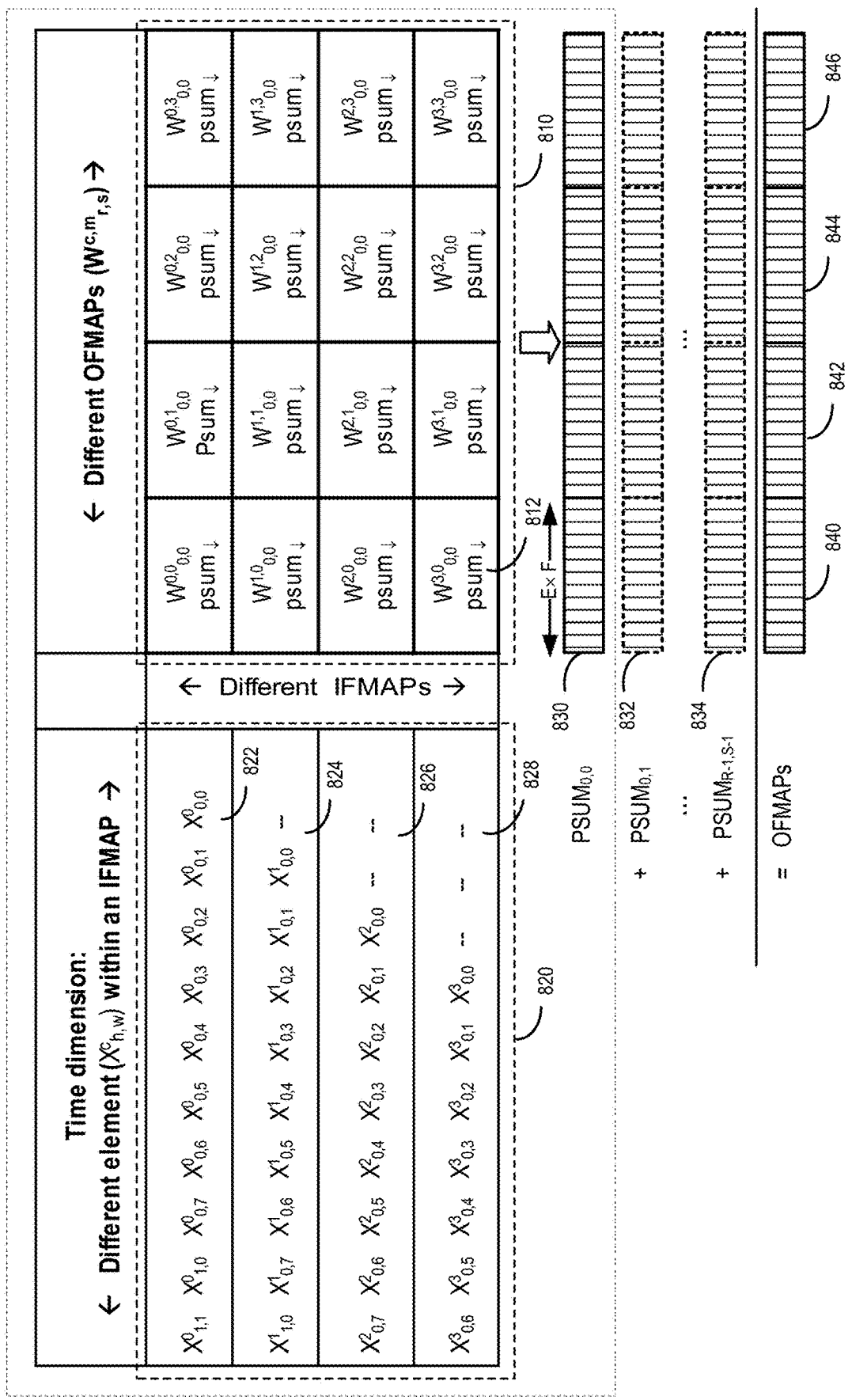
FIG. 8 illustrates a simplified example of weight-stationary convolution using an example of a computing engine including a processing element array according to certain embodiments.

FIG. 8 illustrates a simplified example of a weight-stationary convolution operation using an example of a computing engine including a processing element array 810 according to certain embodiments. Processing element array 810 may include a large number of processing elements arranged in, for example, a 64×64 array, a 64×128 array, a 128×128 array, a 256×256 array, or the like. In the example illustrated in FIG. 8, processing element array 810 includes four rows and four columns of processing elements 812. Inputs 820 to processing element array 810 may include four (corresponding to C) input channels 822, 824, 826, and 828. Each input channel may correspond to one input feature map or one input feature map in each of N (N=1 in the example) of inputs as described above. Each input feature map in the example may include an 8×8 matrix and may be flattened into a one-dimensional vector with 64 elements. PE array 810 may generate four (corresponding to M) output feature maps, one from each column of PE array 810.

During the convolution operation, a weight in each 2-D filter (with dimensions R×S) of the four 2-D filters in each of the four 3-D filters (with dimensions C×R×S) may be pre-loaded into PE array 810. For example, as shown in FIG. 8, the first element (r=0, s=0) in each of the four 2-D filters for the first output feature map (correspond to the first 3-D filter or m=0) may be loaded into a respective PE 812 of the four PEs in a first column of PE array 810, the first element (e.g., r=0, s=0) in each of the four 2-D filters for the second output feature map (correspond to the second 3-D filter or m=1) may be loaded into a respective PE 812 of the four PEs in a second column of PE array 810, the first element (r=0, s=0) in each of the four 2-D filters for the third output feature map (correspond to the third 3-D filter or m=2) may be loaded into a respective PE 812 of the four PEs in a third column of PE array 810, and the first element (r=0, s=0) in each of the four 2-D filters for the fourth output feature map (correspond to the fourth 3-D filter or m=3) may be loaded into a respective PE 812 of the four PEs in a fourth column of PE array 810. Thus, 16 values representing the first elements of 16 2-D filters in four 3-D filters are loaded into PE array 810. The elements in the one-dimensional vector for each input feature map may then be shifted into PE array 810 from, for example, a state buffer, and may be multiplied with the pre-loaded weights in PE array 810. The products in each column for the four channels 822, 824, 826, and 828 may be accumulated to generate four partial sum values. As the elements in the one-dimensional vector for each input feature map are shifted into PE array 810, a first partial sum vector $PSUM_{0,0}$ (830) that may include four partial sum sub-vectors for four output feature maps may be generated. In some embodiments, the shifting of the elements in the input feature maps may be based on the desired strides for the convolution, such that each partial sum sub-vector for an output feature map may include the desired number of elements (e.g., E×F as described above).

Sixteen (16) values representing the second elements (e.g., r=0, s=1) of the 16 2-D filters in the four 3-D filter may then be loaded into PE array 810. The elements in the one-dimensional vector for each input feature map may be shifted into PE array 810 and may be multiplied with the pre-loaded weights in PE array 810. The products in each column may be accumulated to generate a second partial sum vector $PSUM_{0,1}$ (832) that includes four partial sum sub-vectors for the four output feature maps. Each element in the 16 2-D filters may be loaded into PE array 810 and multiplied with the elements in the one-dimensional vector to generate a partial sum vector that includes four partial sum sub-values for the four output feature maps until a partial sum vector $PSUM_{R-1,S-1}$ (834) that corresponds to the element (R−1, S−1) in each 2-D filter and includes four partial sum sub-vectors for the four output feature maps is generated. The partial sum sub-vectors in partial sum vectors $PSUM_{0,0}$ (830), $PSUM_{0,1}$ (832), . . . , and $PSUM_{R-1,S-1}$ (834) and corresponding to each respective output feature map may be accumulated to generate a respective vector 840, 842, 844, or 846 that may correspond to a flattened output feature map.

As shown in FIGS. 5, 6, and 8 and Equation 3, a processing element array may perform parallel computation using different columns, which may correspond to different filters or different sets of filters. The processing element array may also perform fused multiply and add operations for data reduction in the dimensions of, for example, input channels, filter height, and filter width, using the columns and rows. In many convolutional neural networks, the number of channels may increase as the layer gets deeper. Many convolution layers can have more than 128 input channels, which may be large enough to utilize all rows of the processing element array. However, the number of input channels in the first layer or the first few layers of a CNN, such as a CNN for image recognition or classification, may usually include 3 channels for the R, G, B components of a color image. For example, the first convolution layer of ResNet-50 may use three input feature maps (e.g., each having a size of 224×224) and may use small filters (e.g., each with a size of 7×7) and a 2×2 stride. The number of input channels or input feature maps (e.g., 3) may be too small compared to the number of rows in a PE-Array (e.g., 128). Thus, the PE Array utilization may be very low for at least the first layer of a CNN when one filter element in each filter is used at the same time. The low utilization of the processing element array for the first layer or the first few layers may significantly reduce the overall utilization of the processing element array for many inferences.

According to certain embodiments, a convolution operation in a neural network layer that has a small number of input channels may be performed by multiple weight-stationary convolution operations, where an input feature map or a portion of the input feature map may be sequentially input into multiple rows, and multiple filter elements of a same filter may be loaded into the multiple rows of the processing element array at a same time to apply to the same input channel map or the same portion of the input feature map, thus improving the utilization of the processing element array. To avoid having more than one copy of the input feature map in the memory (e.g., memory subsystem 704) and/or to reduce the data transfer bandwidth used to move the input feature map from the memory (into the processing element array (e.g., processing element array 710), the multiple rows of the processing element array may share the input data. For example, the input data may be read from the memory once and replicated by input selector circuit 730 to input into the multiple rows of processing element array 710 to improve the utilization of processing element array 710 while reducing the memory bandwidth usage for data transfer.

In some embodiments, the input data may be partitioned into multiple blocks for loading into different rows when, for example, the stride for the convolution is greater than one. In some embodiments, a compiler may identify neural network layers that may utilize a small portion of the processing element array in an accelerator, partition the convolution operation in each of these network layers into multiple convolution operations, prepare (e.g., pad and partition) input data, generate a new data flow graph, generate data sharing instructions, and generate instructions for operations to be performed on the convolution results, such as discarding certain output data.

Figure 9A:
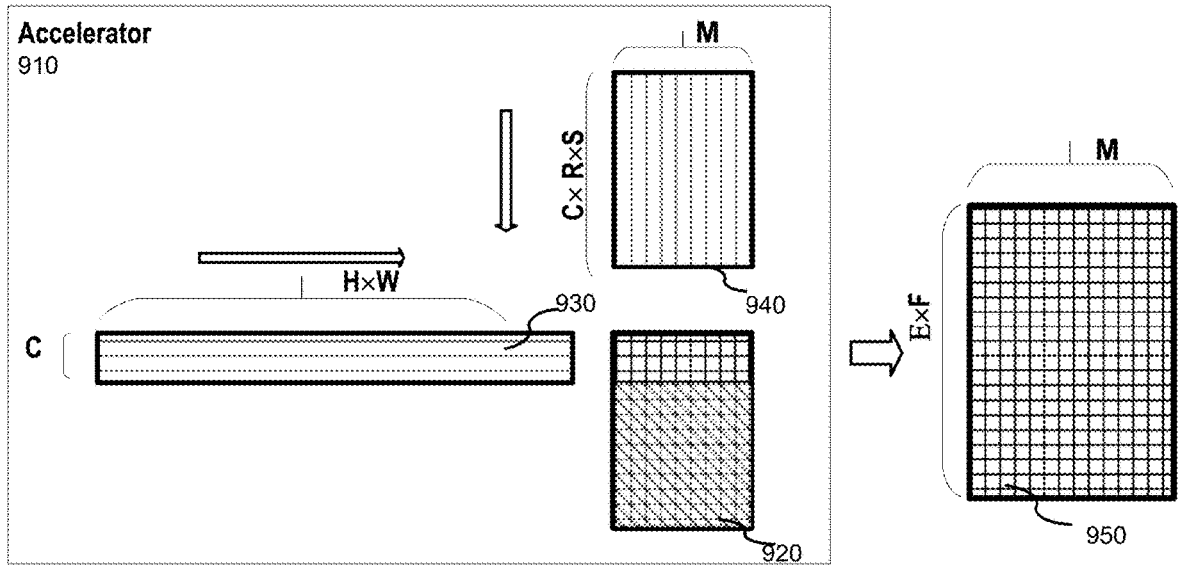
FIGS. 9A and 9B illustrate an example of loading multiple filter elements in a processing element array to more efficiently utilize the processing element array, and sharing input data among rows of the processing element array for processing using the loaded filter elements according to certain embodiments.
Figure 9B:
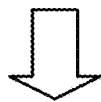
Figure 9B:
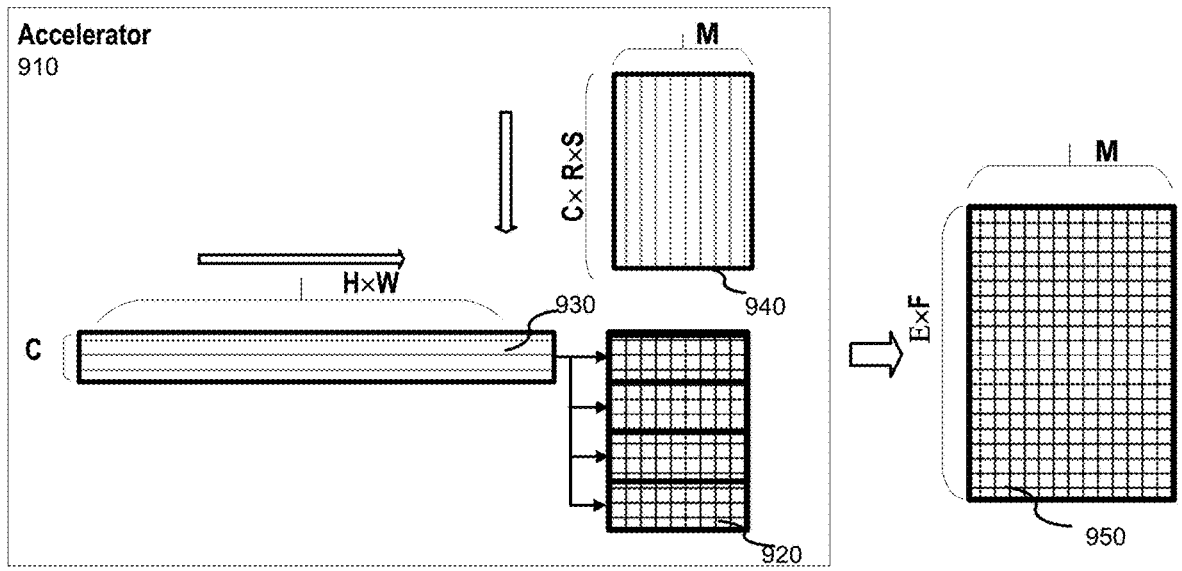

FIGS. 9A and 9B illustrate an example of loading multiple filter elements in a processing element array to more efficiently utilize the processing element array, and sharing input data among rows of the processing element array for processing using the loaded filter elements according to certain embodiments. As illustrated in FIG. 9A, a convolution operation to be performed by an accelerator 910 that includes a PE array 920 may use C channels of 2-D input feature maps 930 (each with dimensions H×W) and filters 940 that include M set of filters, where each set of filters may include C 2-D filters (each with dimensions R×S). Each input feature map 930 may be flattened into a vector including H×W pixel values, where pixel values in each input feature map may be mapped to a corresponding row in PE array 920. Filters 940 may be flattened to M channels each including C×R×S weight values, where each of the M channels may be mapped to a corresponding column in PE array 920. During the convolutional operation, one filter element in each 2-D filter in a set of C 2-D filters may be loaded into a row in a corresponding column of the M columns, and pixel values in each input feature map may be sequentially sent to processing elements in the corresponding row in PE array 920 to perform the fused-multiply-and-add operations as described above. Thus, C rows of PE array 920 may be used during a same time period. Afterward, another filter element in each 2-D filter in the set of C 2-D filters may be loaded into a row in a corresponding column of the M columns, and data from each input feature map may be sequentially sent to processing elements in the corresponding row in PE array 920. Thus, the same C rows of PE array 920 may be used during a same time period. In this way, each filter element may be loaded into PE array 920 and may be applied to an input feature map to generate M output feature maps 950. In the example shown in FIG. 9, C may be much lower than the number of rows in PE array 920. Thus, the convolution operation may only utilize a small portion of PE array 920 at any given time.

According to certain embodiments as shown in FIG. 9B, multiple (e.g., 4) filter elements in each 2-D filter in a set of C channels of 2-D filters may be loaded into multiple (e.g., 4) rows in a corresponding column of the M columns. Pixel values in each input feature map may be replicated and sequentially sent to processing elements in multiple (e.g., 4) corresponding rows in PE array 920 to perform the fused-multiply-and-add operations. Thus, 4×C rows of PE array 920 may be used during a same time period. Afterward, another multiple (e.g., 4) filter elements in each 2-D filter in the set of C 2-D filters may be loaded into multiple (e.g., 4) rows in a corresponding column of the M columns. Pixel values in each input feature map may be replicated and sequentially sent to processing elements in multiple corresponding rows in PE array 920 to perform the fused-multiply-and-add operations. Thus, 4×C rows of PE array 920 may be used during a same time period. In this way, each filter element in C channels of 2-D filters may be loaded into PE array 920 and applied to an input feature map to generate M output feature maps 950. As such, the convolution operation may be performed faster using more rows of PE array 920 at a same time.

Figure 10:
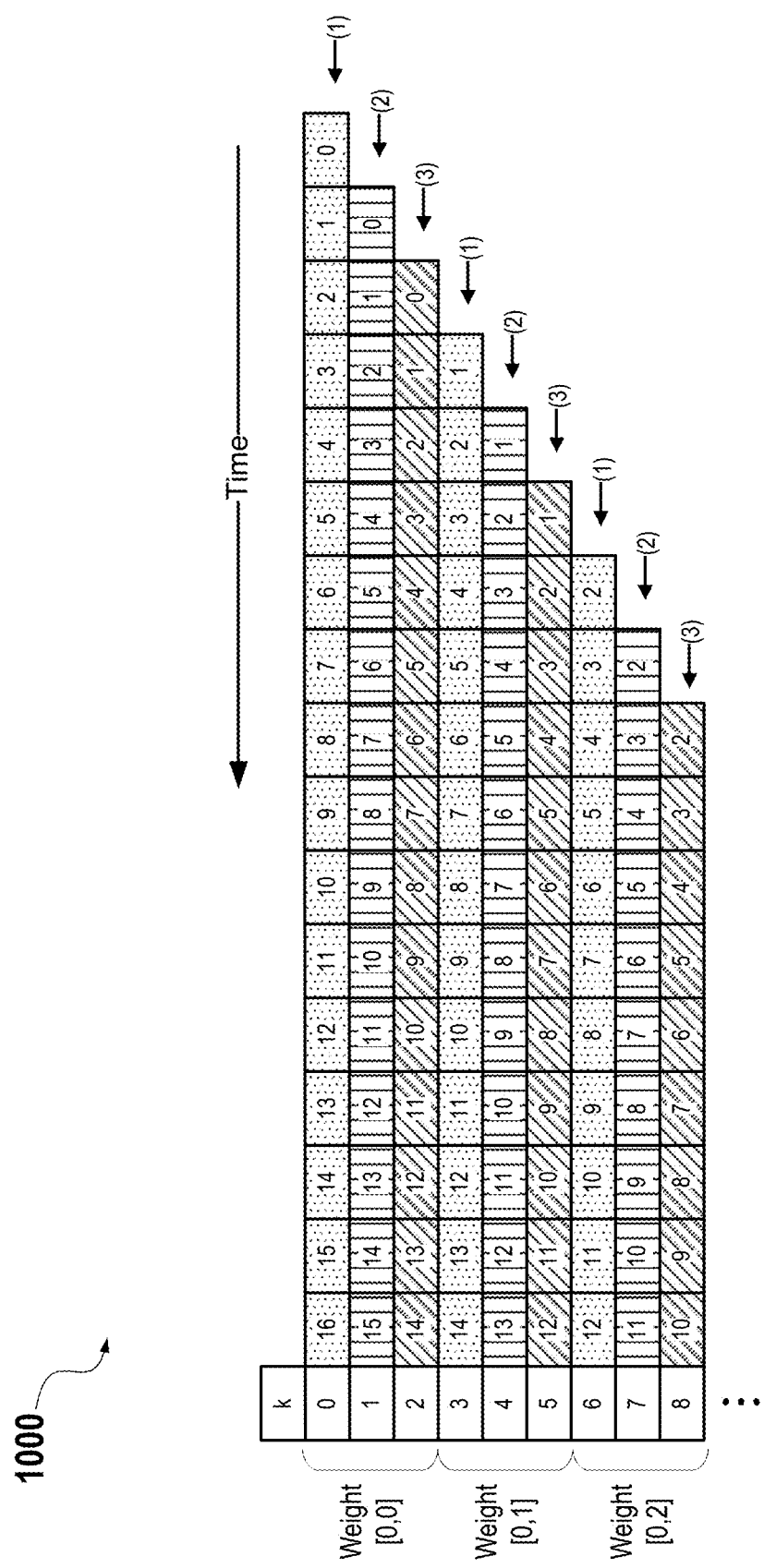
FIG. 10 illustrates an example of replicating input feature maps read from a memory for sending to multiple rows of a processing element array according to certain embodiments.

FIG. 10 includes a chart 1000 that illustrates an example of replicating each input feature map read from a memory for sending to multiple rows of a processing element array according to certain embodiments. FIG. 10 may illustrate an example of input data for rows in PE array 920. For the sake of clarity, only input data for several rows of a PE array are shown, the input data for other rows can be replicated and sent in a similar manner, or in a different manner, and from similar or different sources (e.g., memory devices or memory banks). To illustrate the example of FIG. 10, input matrix 410 of FIG. 4 is used as an example of the input data for a layer of a neural network. Chart 1000 illustrates data being obtained for three input channels (e.g., R, G, and B channels of an input image). The different input channels (e.g., represented by input feature maps) are indicated in FIG. 10 using different cross hatchings. In FIG. 10, time is indicated as progressing from right to left, such that data to enter the processing element array earlier may be in the right-hand columns and data to enter the processing element array later may be in the left-hand columns.

In the example chart 1000 shown in FIG. 10, the first column indicates a row number k (1011) of a PE array, and the remaining columns indicate elements (e.g., pixels) in an input feature map to be supplied to the corresponding rows of the PE array. In this example, the elements of the input feature map (e.g., input matrix 410) are numbered from left to right and top to bottom, in a raster scan order. For example, the element at the upper left corner of input matrix 410 is element [0], the element at the upper right corner is element [5], the element at the lower left corner is element [30], and the element at the lower right corner of input matrix 410 is element [35]. Also in this example, the elements in the input feature map are shifted into the PE array from left to right, such that the elements in the right-hand columns enter the processing element array before the elements in the left-hand columns. In some examples, each column may correspond to a clock cycle and may indicate the data input into the processing element array in a different clock cycle. In the example shown in FIG. 10, numbers in parenthesis indicate a channel index, such as channel 1, channel 2, or channel 3. The first three rows of the PE array may be loaded with filter element [0,0] of each filter in three filters, where each filter may correspond to an input channel. Row [3] to Row [5] may be loaded with filter element [0,1] of each filter corresponding to a respective input channel in the three input channels. Row [6] to row [8] may be loaded with filter element [0, 2] of each filter corresponding to a respective input channel in the three input channels.

Row [0] may receive data in a first input feature map and apply filter element [0, 0] of a first filter for the first input feature map to the received data. Row [1] may receive data in the second input feature map, and apply filter element [0, 0] of a second filter for the second input feature map to the received data. Row [2] may receive data in the third input feature map, and apply filter element [0, 0] in a third filter for the third input feature map to the received data. In one example, rows [0], [1], and [2] may receive data from the local buffer memory, such as memory subsystem 704.

Further in this example, row [3] may also receive data in the first input feature map, and may apply filter element [0, 1] of the first filter to the received data. For this row, instead of obtaining the data in the first input feature map from the local buffer memory, an input selector circuit as described above and below can be configured to route the data that is being provided to row [0] to row [3]. As illustrated in the example of FIG. 10, filter element [0, 1] is not applied to element [0] of each input feature map, thus the input selector circuit may only replicate the input data when element [1] of the first input feature map is read from the buffer memory. Additionally, for correct accumulation of the data into an output feature map, the data sent to row [3] may be delayed (e.g., by two clock cycles) from the data sent to row [0].

Row [4] may similarly receive data for the second input feature map, starting at element [1] and delayed from the data sent to row [1]. The input selector circuit can similarly obtain the data for row [4] by routing the data being input into row [1] to row [4] with a delay of, for example, two clock cycle. The data input into row [4] may be multiplied with filter element [0,1] of the second filter. Row [5] may similarly receive data for the third input feature map, starting at element [1], and delayed from the data sent to row [2]. The input selector circuit may obtain the data for row[5] from the data being input into row [2] with a delay of, for example, two clock cycles. The data input into row [5] may be multiplied with filter element [0,1] in the third filter.

Row [6] can also receive data from the first input feature map. In row [6], a third filter element [0,2] in the first filter may be applied to the first input feature map, starting at element [2] of first input feature map. For row [6], the input selector circuit may obtain input data from the data that is sent to row [0] or from the data that is sent to row[3]. For example, when the input selector circuit is able to look back at least six rows from row [6], the input selector circuit may use the data sent to either row [0] or row[3]. When the input selector circuit is able to look back at most three rows, the input selector circuit may use the data sent to row[3]. Row [7] may similarly be supplied with data from the second input feature map, obtained from the data sent to row [1] or row[4], and apply filter element [0, 2] in the second filter to the supplied data. Row [8] may be supplied with data from the third input feature map, obtained from data sent to row [2] or row [5], and may apply filter element [0, 2] in the third filter to the supplied data.

The example illustrated in chart 1000 can be used, for example, when performing the convolution computations for the first layer of a neural network, where the strides in the width and height direction are both one. As discussed above, the inputs to the first layer may include three or more input feature maps, and applying filters to these input feature maps may occupy only three rows of the processing element array. By duplicating each of the three input feature maps for sending to multiple rows of the processing element array and for filtering by multiple filter elements in each respective filter, more processing elements can be utilized when computing results for the first layer. Subsequent layers may have more input feature maps. For these layers, the input selector circuit may replicate each input feature map for a smaller number of times or may disable the data replication and select the output from the buffer memory. In some examples, for various layers of the neural network, the input selector circuit may select the output of the buffer memory for some rows and select duplicated data for other rows.

Figure 11:
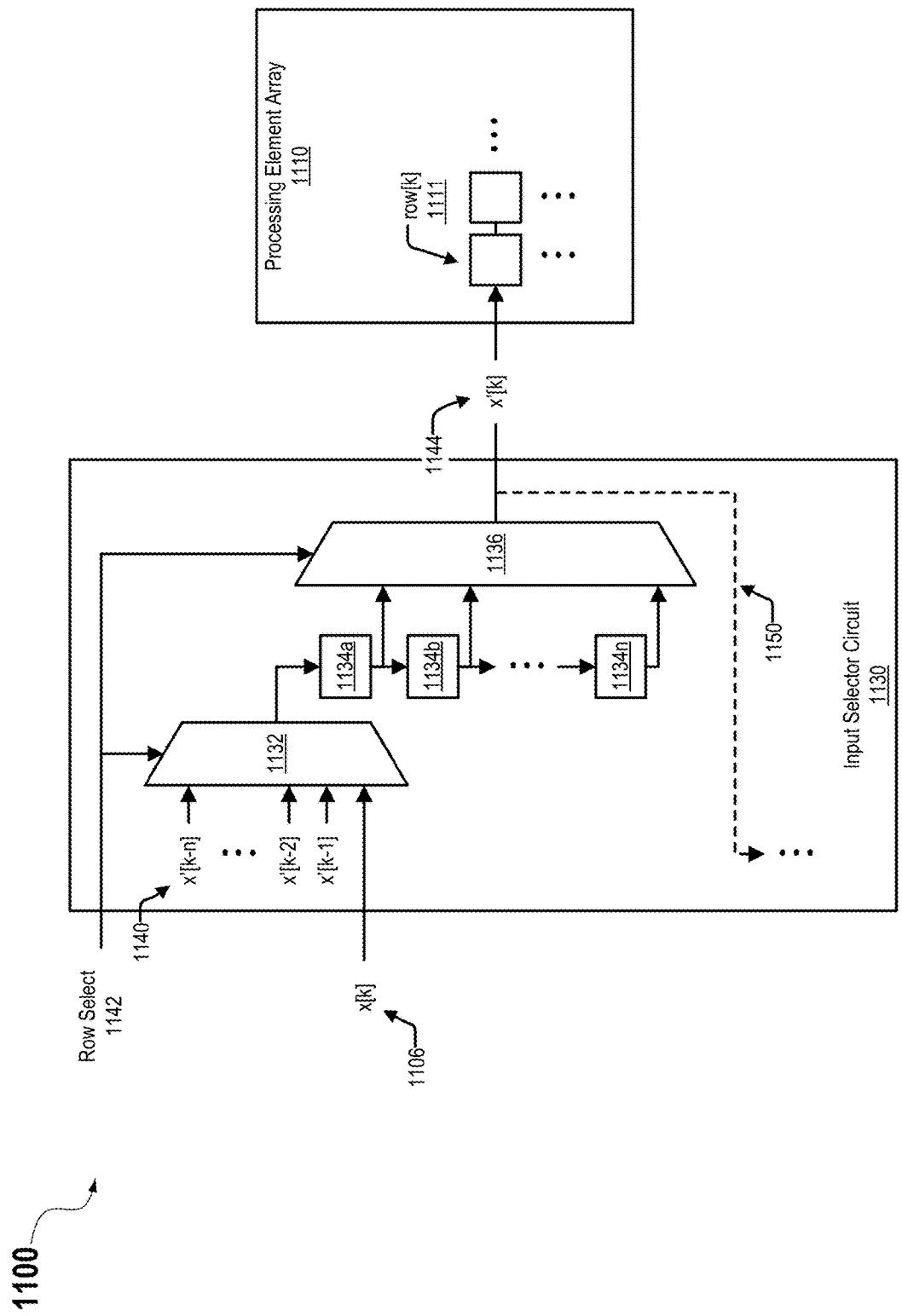
FIG. 11 includes a simplified block diagram of an example of an input selector circuit for selecting input data for parallel processing by a processing element array using multiple filter elements according to certain embodiments.

FIG. 11 includes a simplified block diagram of an example of an input selector circuit 1100, such as input selector circuit 730 described above, for selecting input data for parallel processing by a processing element array using multiple filter elements according to certain embodiments. In the illustrated example, input selector circuit 1100 may include a first multiplexor 1132 that may be configured to select the input data for a row of a processing element array 1110, and a second multiplexor 1136 that may select an appropriate delay for inputting the selected data into a row of processing element array 1110. A row select 1142 sent to input selector circuit 1130 may determine the data, x'[k] (1144), that is ultimately selected for the row. For the sake of clarity, the multiplexors for only one row (e.g., row[k] (1111)) is shown, where k denotes a row number. It is noted that a similar circuit as illustrated in FIG. 11 can be used to select the input data for other rows of processing element array 1110. In some cases, other rows of processing element array 1110 may each have a similar input selector circuit.

In various examples, a neural network processing engine may be configured such that one memory bank from the neural network processing engine's memory subsystem may provide input data for one row of processing element array 1110. This arrangement can enable the data from one input feature map to be loaded into one memory bank, from which the data for the input feature map can then be input into the a row of processing element array 1110. In the example of FIG. 11, the data output by the memory bank for row[k] (1111) is denoted as x[k] (1106). For memory bank output x[k] (1106) to be input into row[k] (1111), row select 1142 may configure first multiplexor 1132 to select memory bank output x[k] (1106) as the output of first multiplexor 1132.

In various examples, first multiplexor 1132 may also select from among other data 1140 selected for inputting to other rows of processing element array 1110. Other data 1140 may be from the outputs of other multiplexors, for example, in other selectors circuits (not shown explicitly in FIG. 11). For example, other data 1140 may include the data selected for inputting into row[k−1] (e.g., the row preceding row[k] (1111)), which is denoted x'[k−1] in the example of FIG. 11. As another example, other data 1140 may include data selected for inputting into row[k−2] (e.g., two rows preceding row[k] (1111)), which is denoted x'[k−2]. As another example, other data 1140 may include data selected for inputting into row [k−n], which is denoted x'[k−n]. In some embodiments, the inputs to first multiplexor 1132 for row [k] may include data selected for inputting into row [k−3], row [k−6], row [k−9], . . . , and row [k−3×n] when three input channels, such as R, G, and B channels, are used in the convolution operation.

In some examples, it may be desirable to delay the data selected by first multiplexor 1132 by a certain number of clock cycles. Because processing element array 1110 may be a systolic array, the timing of loading data into processing element array 1110 may affect the result that processing element array 1110 computes. Thus, in various implementations, input selector circuit 1130 may include one or more delay circuits 1134a-1134n, such as flip-flops, which may delay the output of first multiplexor 1132 by 1, 2, . . . , and n clock cycles. Delay circuits 1134a-1134n may be connected in a chain such that a delay circuit may further delay the output from the immediately preceding delay circuit. For example, a first delay circuit 1134a may delay the data by one clock cycle, a second delay circuit 1134b may further delay the data by a clock cycle, and so on. In some embodiments, delay circuits 1134a-1134n may each have a different delay. For example, a first delay circuit 1134a may delay the data by one clock cycle, a second delay circuit 1134b may delay the data by two clock cycles, a third delay circuit may delay the data by four clock cycles, and so on. In some embodiments, any delay circuit in delay circuits 1134a-1134n may be bypassed to achieve a desired overall delay by the chain. Input selector circuit 1130 may include a second multiplexor 1136 that can be configured to select the desired delay at the output of a delay circuit. The output of second multiplexor 1136, denoted x'[k] (1144) can be output by input selector circuit 1130 as the input to row [k] (1111).

In various examples, x'[k] (1144) can also be the input for other rows. This is illustrated in the example of FIG. 11 by a dashed line 1150 from the output of second multiplexor 1136. As an example, x'[k] (1144) can be an input into a multiplexor that selects input data for row [k+1] and/or a multiplexor that selects input data for row [k+2] or the like. In these and other examples, x'[k] (1144) may be input into more than one row of processing element array 1110. In some examples, x'[k] (1144) can be selected for input into a row up to, for example, eight rows below row[k] (1111).

In various examples, the delay selected by second multiplexor 1136 may be determined based on the data selected by first multiplexor 1132. For example, as illustrated in the example of FIG. 10, when row select 1142 selects x'[k−1], second multiplexor 1136 may be configured to delay this data by one clock cycle. As another example, when row select 1142 selects x'[k−2], second multiplexor 1136 may be configured to delay this data by two clock cycles. In these and other examples, row select 1142 may be used to configure or control both first multiplexor 1132 and second multiplexor 1136. In some examples, row select 1142 may be part of an instruction for implementing the a neural network. Row select 1142 may, for example, be stored with the filters, and be loaded into the memory subsystem of a processing engine along with the filter element (e.g., weights). In some examples, row select 1142 may be determined by software that operates the neural network processing engine. In some examples, row select 1142 can vary for different layers of a neural network. For example, for a first layer of the neural network, row select 1142 may configure first multiplexor 1132 to select from other data 1140 to replicate previously read and used data, while for subsequent layers, row select 1142 may select data from memory bank output x[k] (1106).

As noted previously, the arrangement of the multiplexors, delay circuits, and signals in the input selector circuit can be similar for other rows of processing element array 1110. In some examples, input selector circuit 1130 may have a different circuit for some rows. For example, for row [0], input selector circuit 1130 may only be operable to select a memory output as the input for row [0]. In this example, input selector circuit 1130 may have only a delay circuit between the memory output and the input to processing element array 1110. As another example, for row [1], input selector circuit 1130 may have only the memory output and the data selected for row [0] as possible choices for the input for row [1]. In this example, the circuit for row [1] can include a multiplexor with fewer inputs, as well as fewer delay circuits. In some examples, some rows may have fewer choices as possible inputs than other rows. For example, some rows may be configured to receive data provided to either one of two preceding rows, while other rows may be configured to receive data provided to any one of eight preceding rows. In some examples, input selector circuit 1130 may be configured to select a portion of the input to another row of processing element array 1110.

As described above, in a convolution operation, the filter may slide over the input feature map according to certain strides. For example, in the examples shown in FIGS. 4A-4C, 8, and 10, the stride=1, where filter element [0, 0] may multiply with input feature map elements [0, 0], [0, 1], [0, 2], . . . , and the like, while filter element [0, 1] may multiply with input feature map element [0, 1], [0, 2], [0, 3], . . . , and the like. In the first layer of ResNet-50, the filters (e.g., each with a size of 7×7) may slide over the input feature maps (e.g., each having a size of 224×224) with a 2×2 stride. Thus, filter element [0, 0] may multiply with input feature map elements [0,0], [0, 2], [0, 4], . . . , and the like, while filter element [0, 1] may multiply with input feature map element [0, 1], [0, 3], [0, 5], . . . , and the like. Thus, different subsets of the input feature map (e.g., at different start points) may be sent to rows of a PE array loaded with different filter elements.

Figure 12:
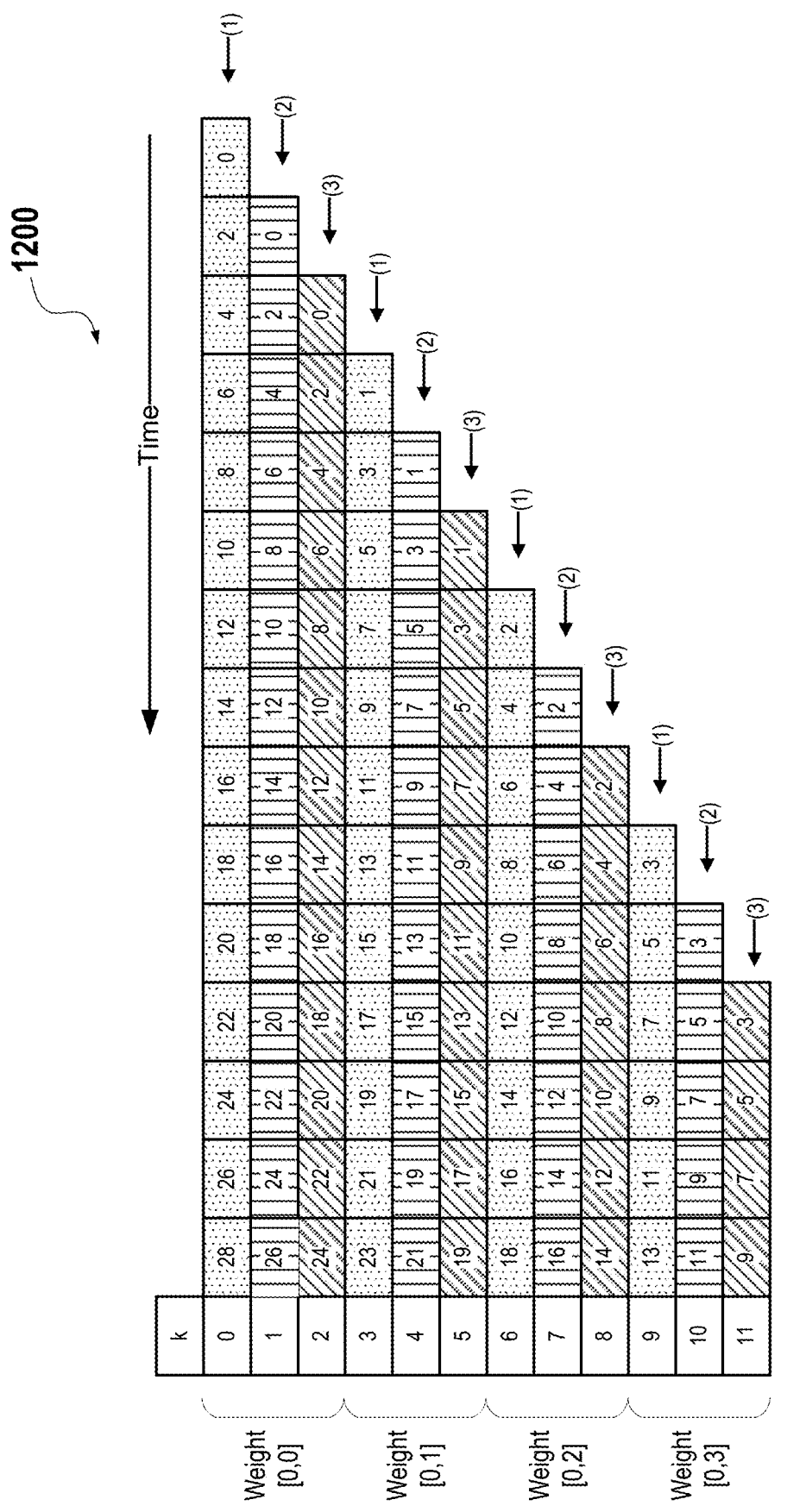
FIG. 12 illustrates another example of replicating input data for parallel processing by a processing element array using multiple filter elements according to certain embodiments.

FIG. 12 includes a chart 1200 that illustrates another example of replicating input data for parallel processing by a processing element array using multiple filter elements according to certain embodiments. In the example shown in FIG. 12, the stride in the width direction may be 2. In this example, for the sake of clarity, only data for rows [0] through [11] are shown, and it is noted that the processing element array may have many more rows (e.g., 64, 128, 256, or more rows). In chart 1200, the first column indicates a row number k (1211), and the remaining columns indicate elements in an input feature map to be supplied to a corresponding row in the PE array. The elements of the input feature map are number from left to right and top to bottom in a raster scan order. Chart 1200 illustrates data being obtained for three input feature maps. Numbers in parenthesis indicate the input channel numbers. The different input feature maps are also indicated in FIG. 12 using different cross hatchings. As FIG. 10, time is indicated here as progressing from right to left, such that data to enter the processing element array earlier may be in the right-hand columns, while data to enter the processing element array later may be in the left-hand columns.

In the example shown in FIG. 12, row [0] and row [3] both receive data in the first input feature map, with row [0] receiving the even-numbered elements and row [3] receiving the odd-numbered elements. A first filter element [0, 0] of the filter for the first input feature map is applied to the even-numbered elements, and a second filter element [0, 1] of the filter for the first input feature map is applied to the odd-numbered elements. For example, in the first sliding window position, the first filter element [0, 0] may be multiplied with the first element [0] of the first input feature map, and the second filter element [0, 1] may be multiplied with the second element [1] of the first input feature map. In the second sliding window position, the first filter element [0, 0] may be multiplied with the third element [2] of the first input feature map, and the second filter element [0, 1] may be multiplied with the fourth element [3] of the first input feature map.

According to certain embodiments, to provide even-number elements and odd-numbered elements to different rows, the software (e.g., a compiler or an operation in the neural network model) may divide and write the data in the input feature map into two different banks in the local buffer memory. An input selector circuit as described above (e.g., input selector circuit 1130) may select from the outputs of the two banks as the input to row [0] and row [3], respectively. Entry of the data (e.g., odd-numbered elements) for row [3] may be delayed by several clock cycles with respect to the data (e.g., even-numbered elements) for row [0] through the mechanism that reads data from the buffer memory and/or by the input selector circuit.

The data for a second input feature map and a third input feature map can each be similarly divided and written into two banks for sending to two respective rows. In the example shown in FIG. 12, the even-numbered elements of the second input feature map may be input into row [1] and the odd-numbered elements of the second input feature map may be input into row [4]. The even-numbered elements of the third input feature map may be input into row [2] and the odd-numbered elements of the third input feature map may be input into row [5]. The first filter elements [0,0] of the filters for the second and third input feature maps may be loaded in row [1] and row [2], respectively, and the second filter elements [0, 1] for the second and third input feature maps may be loaded in row [4] and row [5], respectively. As with row [0] and row [3], the data for rows [1], [2], [4], and [5] may be obtained directly from the memory banks, and data entering these rows may be staggered in time by the instructions that read from the memory banks and/or by the input selector circuit.

As shown in FIG. 12, applying filter elements [0, 0] and [0, 1] to three input feature maps may only use six rows in the processing element array. To apply more filter elements to the three input feature maps, the input selector circuit may replicate the data for other rows using data read from the memory and input into rows [0]-[5]. For example, the even-numbered elements for the first input feature map can be replicated from the data input into row [0] and input into row [6], and the odd-numbered elements can be replicated from the data input into row [3] and input into row [9]. A third filter element [0, 2] of the filter for the first input feature map may be loaded in row [6] and a fourth filter element [0, 3] of the filter for the first input feature map may be loaded in row [9]. To enable the data for the first input feature map to be input into row [6] and row [9], the input selector circuit may select for these rows the data being input into row [0] and row [3], respectively, and apply appropriate delays before sending the data to row [6] and row [9]. For example, for row[6], because the third filter element [0, 2] is first applied to input element [2] of the first input feature map, the input selector circuit may activate the routing of data from the data provided to row [0] when input element [2] is available. Additionally, the input selector circuit may delay the entry of the data into higher numbered rows, for example, using the delay circuits described above.

The data for the second and third input feature maps may similarly be replicated from the data input into rows [1], [2], [4], and [5] and input into additional rows, such as rows [7], [8], [10], and [11]. In the example shown in chart 1200, the even-numbered elements from the second feature map may be replicated from the data input into row [1] and input into row [7], and the odd-numbered elements may be replicated from the data input into row [4] and input into row[10]. For the third input feature map, the even-numbered elements may be replicated from the data input into row [2] and input into row[8], and the odd-numbered elements may be replicated from the data input into row [5] and input into row [11]. Row [7] and row [8] may be loaded with third filter elements [0, 2] of the filters for the second and third input feature maps, respectively, to apply to the input elements in the second and third input feature maps. Similarly, row [10] and row [11] may be loaded with third filter elements [0, 3] of the filters for the second and third input feature maps, respectively, to apply to the input elements in the second and third input feature maps. Replicating the data from data input into lower numbered rows, rather than directly from the memory, can significantly reduce the overhead of reading data from the memory, in particular, when the data in an input feature map is input into many, such as tens or more, rows in the processing element array.

In some embodiments, due to the specific hardware configuration, each row of a PE array may use data of the same size (e.g., same number of input elements, such as pixels) for each convolution operation. However, the convolution using the sliding-window and data replication as described above show that there may be shifts of input between the rows, where different rows may use input data at different starting locations and thus different ending locations as well. In addition, in some embodiments, it may be desirable to make the loaded data have a certain length, such as a multiple of 8-byte, for efficient memory storage, direct memory access (DMA) operations, memory reading, or the like. Thus, the input data (e.g., an input feature map) may be padded with padding data before the convolution operation, and certain computation results calculated using the padding data may be discarded after the computation (e.g., multiplications).

Figure 13:
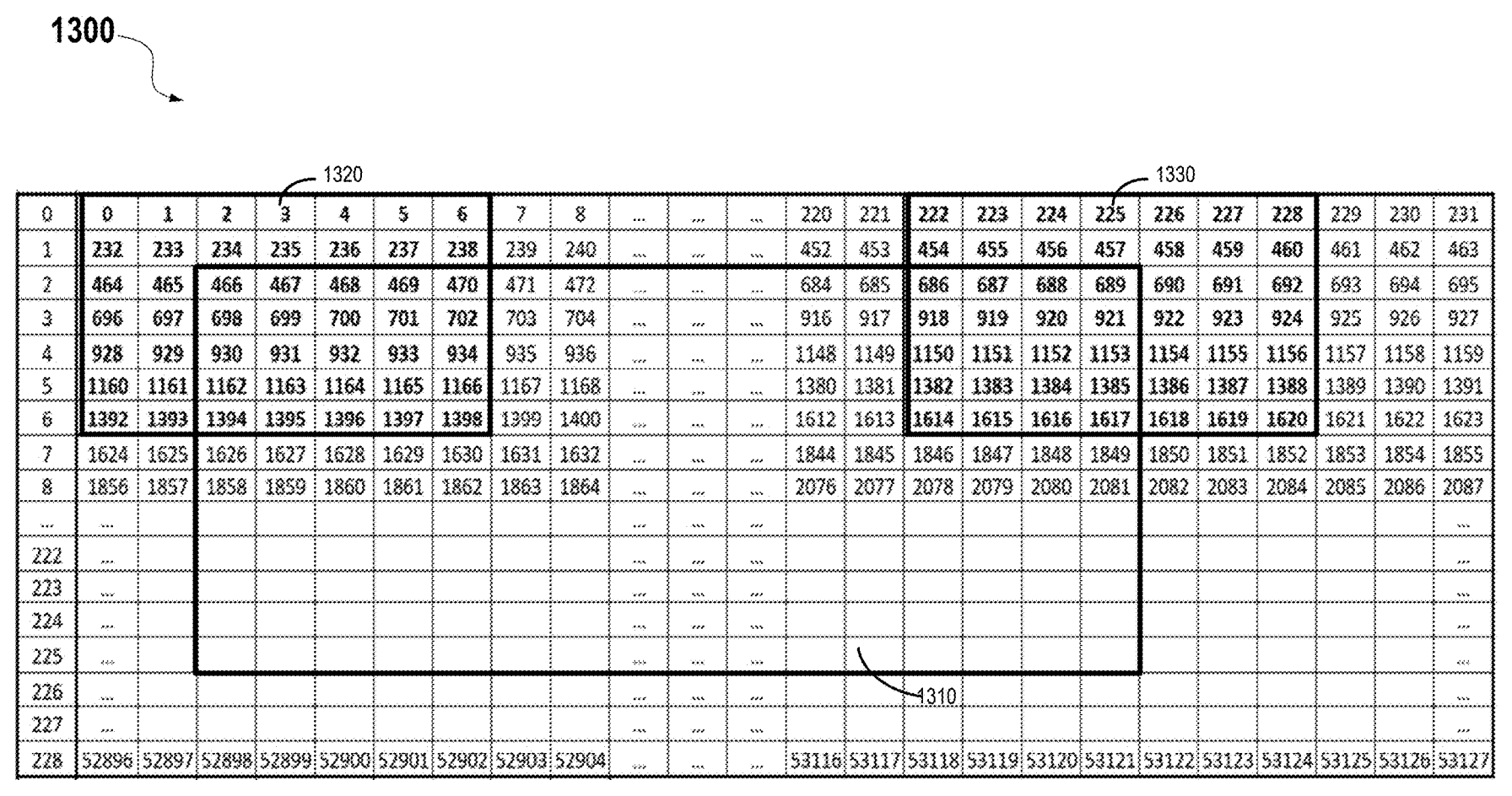

FIG. 13 illustrates an example of a padded input feature map 1300 for a convolution operation according to certain embodiments. Input feature map 1300 may include an original input feature map 1310 and padded input feature elements. In the example shown in FIG. 13, original input feature map 1310 may be an input channel for a ResNet-50, such as the R, G, or B channel of an input color image, and may include, for example, 224×224 input elements (e.g., pixels). Original input feature map 1310 may be convoluted using, for example, a 7×7 filter or kernel. As described above, the additional padded input feature elements in input feature map 1300 and outside of original input feature map 1310 may be added due to the specific hardware configuration, the dimensions of the filters, the strides, the memory alignment condition, the data replication for reducing memory bandwidth usage, and the like, as described above and in more detail below. The input elements in input feature map 1300 shown in FIG. 13 are numbered in the raster scan order as described above.

In a first window 1320 (7×7) in input feature map 1300, the input elements may be multiplied with corresponding filter elements in the 7×7 filter, and the products may be summed. For example, filter elements [0, 0], [0, 1], [0, 2], [0, 3], [0, 4], [0, 5], and [0, 6] may be multiplied with input elements [0], [1], [2], [3], [4], [5], and [6], respectively. Filter elements [6, 0], [6, 1], [6, 2], [6, 3], [6, 4], [6, 5], and [6, 6] may be multiplied with input elements [1392], [1393], [1394], [1395], [1396], [1397], and [1398], respectively.

In a different window 1330 (7×7) in input feature map 1300, the input elements may be multiplied with corresponding filter elements in the 7×7 filter and the products may be summed. For example, filter element [0, 0] may be multiplied with input element [222], filter element [0, 1] may be multiplied with input element [223], . . . , filter element [0, 6] may be multiplied with input element [228], and so on. Filter element [6, 0] may be multiplied with input element [1602], filter element [6, 1] may be multiplied with input element [1603], . . . , and filter element [6, 6] may be multiplied with input element [1608].

In input feature map 1300, some padded input elements may be added such that each row of the PE array may receive the same number of input elements for an input sub-wave. For example, input elements [0], [2], and [4] may be used by filter elements [0, 0], [0, 2], and [0, 4], but may not be used by filter elements and [0, 6], while input element [228] may not be used by filter elements [0, 0], [0, 2], and [0, 4], but may be used by filter element [0, 6]. Some padded input elements may be added such that data input into each row may be more efficiently loaded into and stored in a memory and/or may be more efficiently read out of the memory. For example, it may be desirable that the size of the input elements input into each row of the PE array in an input sub-wave is an integer multiple of 8-byte. Input elements [0], [2], [4], [6], . . . , and [228] may include 115 input elements or 230 bytes, which is not an integer multiple of 8-byte. Input element 230 may be added and input into row [0] of the PE array such that the input elements to row [0] may include 116 input elements or 232 bytes, which is an integer multiple of 8-byte.

FIG. 14 includes a chart 1400 illustrating an example of loading a first set of filter elements in a processing element array, and sharing a first set of data (e.g., data in some even-numbered rows) in input feature map 1300 of FIG. 13 among rows of the processing element array for parallel processing using the loaded filter elements (e.g., weights) according to certain embodiments. The example shown in FIG. 14 illustrates filter elements loaded into the rows in the PE array and input elements shifted into the rows of the PE array in a weight-stationary convolution operation. In the example shown in FIG. 14, the input to the layer of the neural network may include 3 input channels, such as the R, G, and B channels of a color image. The example shown in FIG. 14 may be an example of the first layer in a ResNet-50 network where the input to the first layer includes three 224×224 images (input feature maps), the filter for each image may be a 7×7 matrix, and the filter may slide over the corresponding input image with a 2×2 stride (e.g., skipping every other row and every other column). The 224×224 original input feature map may be padded to generate an input feature map as shown by input feature map 1300 of FIG. 13.

As illustrated, filter elements [0, 0] of the three filters (e.g., kernels) for channels 1-3 may be loaded into rows [0]-[2], respectively; filter elements [0, 1] of the three filters for channels 1-3 may be loaded into rows [3]-[5], respectively; . . . ; and filter elements [0, 6] of the three filters for channels 1-3 may be loaded into rows [18]-[20], respectively. In the first sub-wave shown in FIG. 14, input elements [0], [2], [4], . . . and [230] in each input image may be shifted into row [0], [1], or [2] of the PE array and multiply with the corresponding filter element [0, 0]; input elements [2], [4], [6], ..., [230], and [464] in each input image may be shifted into row [6], [7], or [8] of the PE array and multiply with the corresponding filter element [0, 2]; input elements [4], [6], [8], ..., [230], [464], and [466] in each input image may be shifted into row [12], [13], or [14] of the PE array and multiply with the corresponding filter element [0, 4]; and input elements [6], [8], [10], ..., [230], [464], [466], and [468] in each input image may be shifted into row [18], [19], or [20] of the PE array and multiply with the corresponding filter element [0, 6]. Similarly, input elements [1], [3], [5], ... and [231] in each input image may be shifted into row [3], [4], or [5] of the PE array and multiply with the corresponding filter element [0, 1]; input elements [3], [5], [7], ..., [231], and [465] in each input image may be shifted into row [9], [10], or [11] of the PE array and multiply with the corresponding filter element [0, 3]; and input elements [5], [7], [9], ..., [231], [465], and [467] in each input image may be shifted into row [15], [16], or [17] of the PE array and multiply with the corresponding filter element [0, 5].

Thus, the rows of the PE array may receive input elements starting from different indexes but may share many common input elements. For example, rows [0], [6], [12], and [18] may share many even-numbered input elements in the first input feature map, while rows [3], [9], and [15] may share many odd-numbed input elements in the first input feature map. As such, the input elements in the first input feature map to apply filter elements in the first row of the filter may be partitioned into two blocks and stored in two memory banks, where some even-numbered input elements in the first input feature map may be stored in memory bank 0 and input into rows [0], [6], [12], and [18], and some odd-numbered input elements in the first input feature map may be stored in memory bank 1 and input into rows [3], [9], and [15]. As described above, the data in memory bank 0 may be read and input into row [0] of the PE array, and may be replicated and input into rows [6], [12], and [18] after appropriate delays, for example, by the input selector circuit described above. Similarly, the data in memory bank 1 may be read and input into row [3] of the PE array, and may be replicated and input into rows [9] and [15] after appropriate delays, for example, by the input selector circuit.

In chart 1400, input elements in a box 1410 may not need to be multiplied with the corresponding filter elements as shown by FIG. 13 and thus the products for these input elements may be discarded (e.g., without being added to the sum). As described above, input elements in second to fourth columns 1414, 1416, and 1418 in box 1410 may be input into the corresponding rows so that they may be replicated for use by subsequent rows and the inputs to the different rows may have the same size. For example, input element [224] may not need to multiply with filter element [0, 0], but is input into row [0] such that it can be replicated and used by row [6], [12], or [18] to calculate the partial sum; input element [228] may not need to multiply with filter element [0, 0], [0, 2], or [0, 4] in row [0], [2], or [4], but is input into row [0] such that it can be replicated and used by row [18] to calculate the partial sum. Input elements in a first column 1412 in box 1410 may not be used by any row, but is added so that the input elements read from the memory and input into each row in each sub-wave may include an integer multiple of 8-byte for more efficient memory storage and access (e.g., writing or reading). For example, input element 230 may not be used by any row in rows [0]-[20], but may be included in the input elements for row [0] such that the input elements read from the memory for sending to row [0] in a sub-wave may include 116 (rather than 115) elements and 232 (rather than 230) bytes, where 232 is an integer multiple of 8.

Due to the 2×2 stride, some input elements (e.g., input elements in some odd-numbered rows) of input feature map 1300 may not be multiplied with some filter elements (e.g., filter elements in some even-numbered rows) in the filter, and some input elements (e.g., input elements in some even-number rows) of input feature map 1300 may not be multiplied with some other filter elements (e.g., filter elements in some odd-numbered rows) in the filter. For example, filter elements in row [0] of the filter may not need to be applied to input elements in rows [1], [3], [5], and the like, in input feature map 1300, while filter elements in row [1] of the filter may not need to be applied to input elements in rows [0], [2], [4], and the like, in input feature map 1300. Thus, additional partitioning of the input feature map 1300 may be used to send input data into rows of the PE arrays to apply some filter elements.

Figure 15:
FIG. 15 illustrates an example of loading a second set of filter elements in a processing element array, and sharing a second set of data in the input feature map of FIG. 13 among rows of the processing element array for parallel processing using the loaded filter elements according to certain embodiments.

FIG. 15 includes a chart 1500 illustrating an example of loading a second set of filter elements in a processing element array, and sharing a second set of data (e.g., data in some odd-numbered rows) in input feature map 1300 of FIG. 13 among rows of the processing element array for parallel processing using the loaded filter elements according to certain embodiments. The example shown in FIG. 15 illustrates filter elements loaded into rows in the PE array and input elements shifted into rows of the PE array in a weight-stationary convolution operation. In the example shown in FIG. 15, the input to the layer of the neural network may include 3 input channels, such as the R, G, and B channels of a color image. The example shown in FIG. 15 may be an example of the first layer in a ResNet-50 network where the input to the first layer includes three 224×224 images (input feature maps), the filter for each image may be a 7×7 matrix, and the filter may slide over the corresponding input image with a 2×2 stride (e.g., skipping every other row and every other column). The 224×224 original input feature map may be padded to generate an input feature map as shown by input feature map 1300 of FIG. 13. Depending on the number of rows in the PE array, the second set of filter elements may be loaded into rows [0]-[20] after the first set of filter elements has been applied to the input features maps, or may be loaded into rows [21]-[41] at the time when the first set of filter elements is loaded into rows [0]-[20] if the PE array has 42 or more rows. In some embodiments, some but not all of the second set of filter elements may be loaded into the PE array at the time when the first set of filter elements is loaded into rows [0]-[20] if the PE array has more than 21 but less than 42 rows. In the example shown in FIG. 15, the PE array may include 64, 128, or more rows, and thus the second set of filter elements may be loaded into rows [21]-[41] at the time when the first set of filter elements is loaded into rows [0]-[20].

As illustrated, filter elements [1, 0] of the three filters (e.g., kernels) for channels 1-3 may be loaded into rows [21]-[23], respectively; filter elements [1, 1] of the three filters for channels 1-3 may be loaded into rows [24]-[26], respectively; ... and filter elements [1, 6] of the three filters for channels 1-3 may be loaded into rows [39]-[41], respectively. In the first sub-wave shown in FIG. 15, input elements [232], [234], [236], ... and [462] in each input image may be shifted into row 21, 22, or 23 of the PE array and multiply with the corresponding filter element [1, 0]; input elements [234], [236], [238], ..., [462], and [696] in each input image may be shifted into row 27, 28, or 29 of the PE array and multiply with the corresponding filter element [1, 2]; input elements [236], [238], [240], . . . , [462], [696], and [698] in each input image may be shifted into row 33, 34, or 35 of the PE array and multiply with the corresponding filter element [1, 4]; and input elements [238], [240], [242], . . . , [462], [696], [698], and [700] in each input image may be shifted into row 38, 40, or 41 of the PE array and multiply with the corresponding filter element [1, 6]. Similarly, input elements [233], [235], [237], . . . and [463] in each input image may be shifted into row 24, 25, or 26 of the PE array and multiply with the corresponding filter element [1, 1]; input elements [235], [237], [239], . . . , [463], and [697] in each input image may be shifted into row 30, 31, or 32 of the PE array and multiply with the corresponding filter element [1, 3]; and input elements [237], [239], [241], . . . , [463], [697], and [699] in each input image may be shifted into row 36, 37, or 38 of the PE array and multiply with the corresponding filter element [1, 5].

Thus, the input data for rows of the PE array may start from different input elements but may share many common input elements. For example, rows [21], [27], [33], and [39] may share many even-numbered input elements in the first input feature map, while rows [24], [30], and [36] may share many odd-numbered input elements in the first input feature map. As such, the input elements in the first input feature map to apply filter elements in the second row of the filter may be partitioned into two blocks and stored in two memory banks, where some even-numbered input elements in the first input feature map may be stored in memory bank 2 and input into rows [21], [27], [33], and [39], and some odd-numbered input elements in the first input feature map may be stored in memory bank 3 and input into rows [24], [30], and [36]. As described above, the data in memory bank 2 may be read and input into row [21], and may also be replicated and input into rows [27], [33], and [39] after appropriate delays, for example, by the input selector circuit described above. Similarly, the data in memory bank 3 may be read and input into row [24], and may also be replicated and input into rows [30] and [36] after appropriate delays, for example, by the input selector circuit.

In chart 1500, input elements in a box 1510 may be input elements that may not need to be multiplied with the corresponding filter element and thus the products for these input elements may be discarded (e.g., without being added to the sum). As described above, input elements in second to fourth columns 1514, 1516, and 1518 in box 1510 may be input into the corresponding rows so that they may be replicated for use by subsequent rows and the data input into each row of the PE array may have a same size. For example, input element [456] may not need to multiply with filter element [1, 0], but is input into row [21] such that it can be replicated and used by row [27], [33], or [39] to calculate the partial sum; input element [460] may not need to multiply with filter element [1, 0], [1, 2], or [1, 4] in row [21], [27], or [33], but is input into row [21] such that it can be replicated and used by row [39] to calculate the partial sum. Input elements in a first column 1512 in box 1510 may not be used by any row, but is added for memory alignment as described above.

Figure 16:
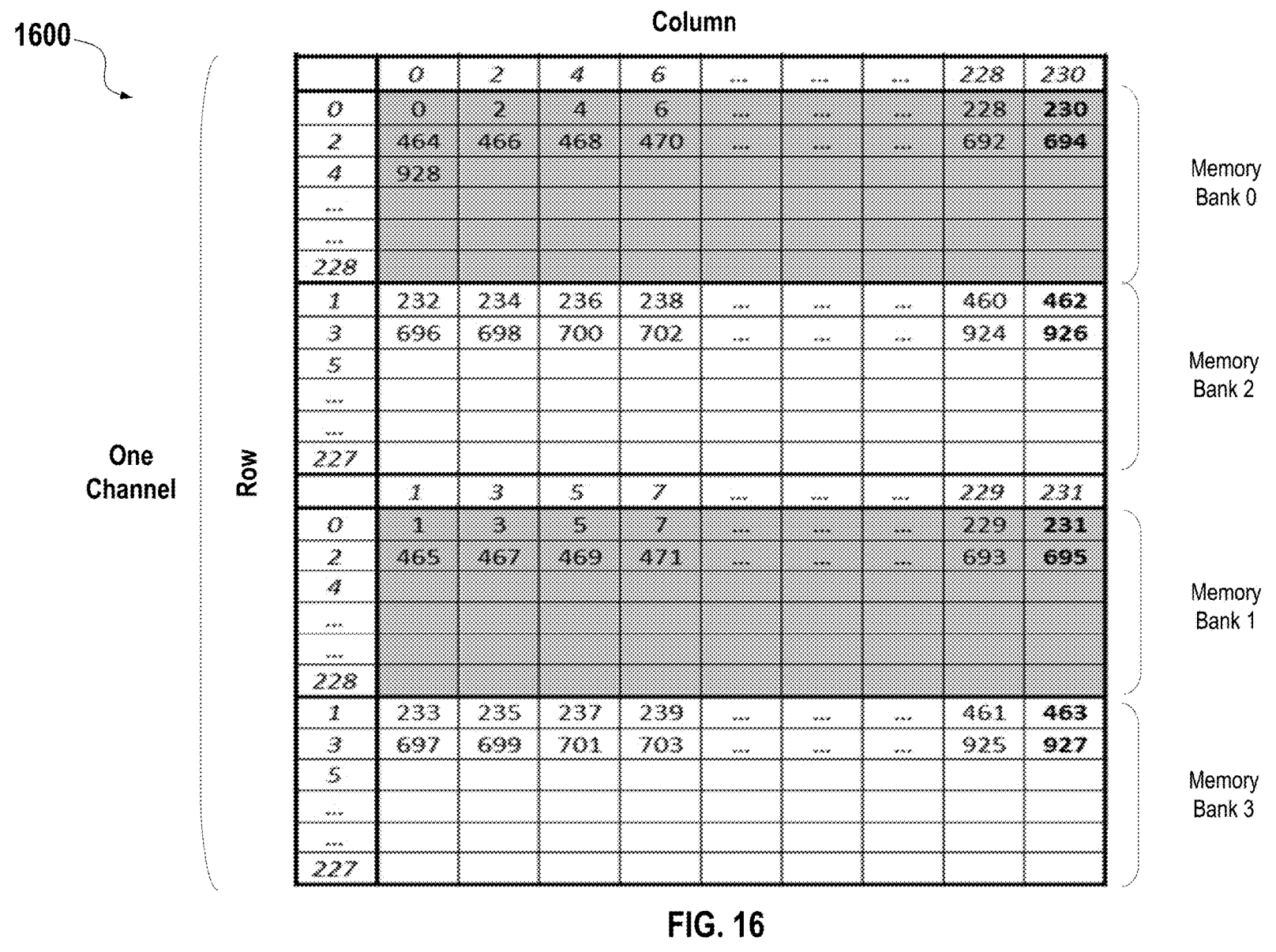

FIG. 16 includes a chart 1600 illustrating an example of partitioning data in input feature map 1300 of FIG. 13 into multiple smaller feature maps for smaller sized data processing using a processing element array according to certain embodiments. As described above with respect to FIGS. 13-15, the example shown in FIG. 16 may be used in, for example, the first layer in a ResNet-50 network where the input to the first layer includes three 224×224 images (input feature maps), the filter for each image may be a 7×7 matrix, and the filter may slide over the corresponding input image with a 2×2 stride (e.g., skipping every other row and every other column). The 224×224 original input feature map may be padded to generate a 229×232 input feature map as shown by input feature map 1300 of FIG. 13. The input feature map may then be partitioned into four blocks for storing in four memory banks as described above with respect to FIGS. 14 and 15.

In the example shown in FIG. 16, memory bank 0 may include input elements in even rows and even columns of input feature map 1300, and may be shifted into rows of the PE array loaded with filter elements in even rows and even columns of the filter. Memory bank 1 may include input elements in even rows and odd columns of input feature map 1300, and may be loaded into rows of the PE array loaded with filter elements in even rows and odd columns of the filter. Memory bank 2 may include input elements in odd rows and even columns of input feature map 1300, and may be loaded into rows of the PE array loaded with filter elements in odd rows and even columns of the filter. Memory bank 4 may include input elements in odd rows and odd columns of input feature map 1300, and may be loaded into rows of the PE array loaded with filter elements in odd rows and odd columns of the filter. As shown in FIGS. 14-16, each memory bank may include input elements for multiple sub-waves.

Figure 17A:
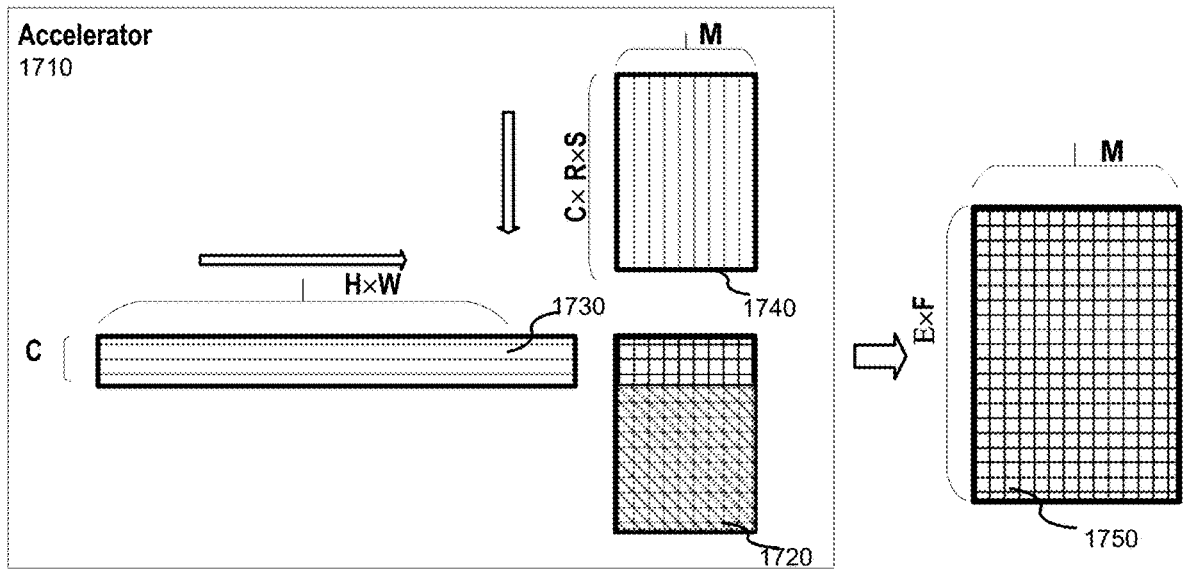
FIGS. 17A and 17B illustrate an example of loading multiple filter elements in a processing element array, and sharing input data among rows of the processing element array for parallel processing using the loaded filter elements according to certain embodiments.
Figure 17B:
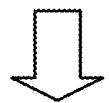
Figure 17B:
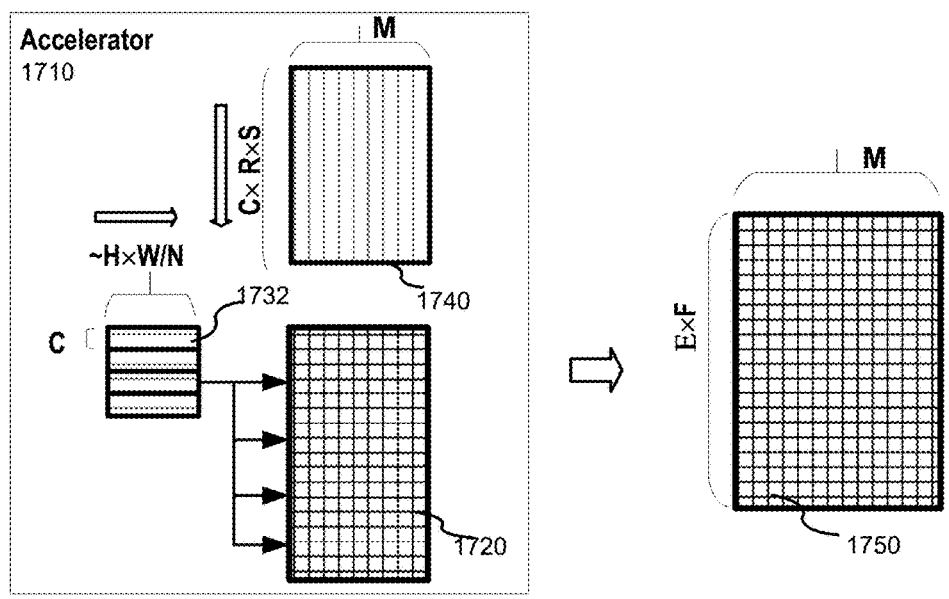

FIGS. 17A and 17B illustrate an example of loading multiple filter elements in a processing element array, and sharing input data among rows of the processing element array for parallel processing using the loaded filter elements according to certain embodiments. As illustrated in FIG. 17A, a convolution operation to be performed by an accelerator 1710 that includes a PE array 1720 may use C channels of 2-D input feature maps 1730 (each with dimensions H×W) and filters 1740 that include M set of filters, where each set of filters may include C 2-D filters (each with dimensions R×S), and each 2-D filter may be used to filter a corresponding 2-D input feature map 1730. Each input feature map 1730 may be flattened into a vector including H×W pixel values, where pixel values in each input feature map 1730 may be mapped to a row in PE array 1720. Filters 1740 may be flattened to M channels each including C×R×S weight values, where each of the M channels may be mapped to a column in PE array 1720. During the convolutional operation, one element in each 2-D filter in a set of C 2-D filters (totally R×S elements) may be loaded into a row in a corresponding column of the M columns, and pixel values in each input feature map may be sequentially sent to processing elements in the corresponding row in PE array 1720 to perform the fused-multiply-and-add operations as described above. Thus, C rows of PE array 1720 may be used during a same time period. Afterward, another element in each 2-D filter in the set of C channels of 2-D filters may be loaded into a row in a corresponding column of the M columns, and pixel values in each input feature map may be sequentially sent to processing elements in the corresponding row in PE array 1720. Thus, the same C rows of PE array 1720 may be used during a same time period. In this way, each filter element may be loaded into PE array 1720 and applied to an input feature map to generate M output feature maps 1750. In the example shown in FIG. 17, C may be much lower than the number of rows in PE array 1720. Thus, the convolution operation may only utilize a small portion of PE array 1720.

According to certain embodiments as shown in FIG. 17B, pixel values in each input feature map (e.g., original input feature map 1310) may be padded to generate an input feature map (e.g., input feature map 1300). Input elements in the input feature map may be divided into multiple (e.g., N) partitions based on, for example, the strides used in the convolution. In one example as described above with respect to FIGS. 14-16, the stride size is 2×2, and each padded input feature map may be divided into four partitions 1732 and may be stored in four memory banks.

During the convolution operation, multiple filter elements (e.g., K filter elements in one or more rows) in each 2-D filter in a set of C 2-D filters may be loaded into multiple (e.g., K) rows in a corresponding column of the M columns. Data in one or more partition 1732 may be read from a memory and input into corresponding rows in PE array 1720. For example, as shown in FIG. 14, data in a first partition 1732 may be read from the memory (e.g., memory bank 0) and shifted into row [0] of PE array 1720 for applying filter element [0, 0], and data in a second partition 1732 may be read from the memory (e.g., memory bank 1) and shifted into row [3] of PE array 1720 for applying filter element [0, 1]. The data input into row [0] of PE array 1720 may be replicated, for example, by an input selector circuit as described above, and sequentially sent to processing elements in multiple corresponding rows (e.g., rows [6], [12], and [18] as shown in FIG. 14) in PE array 1720 to perform the fused-multiply-and-add operations. The data input into row [3] of PE array 1720 may be replicated, for example, by the input selector circuit, and sequentially sent to processing elements in multiple corresponding rows (e.g., rows [9] and [15] as shown in FIG. 14) in PE array 1720 to perform the fused-multiply-and-add operations. Similarly, as shown in FIG. 15, data in a third partition 1732 may be read from the memory (e.g., memory bank 2) and shifted into a row (e.g., row [21]) of PE array 1720 for applying a filter element (e.g., filter element [1, 0]), and data in a fourth partition 1732 may be read from the memory (e.g., memory bank 3) and shifted into a row (e.g., row [24]) of PE array 1720 for applying a filter element (e.g., filter element [1, 1]). The data input into row [21] of PE array 1720 may be replicated, for example, by the input selector circuit, and sequentially sent to processing elements in multiple corresponding rows (e.g., rows [27], [33], and [39] as shown in FIG. 15) in PE array 1720 to perform the fused-multiply-and-add operations. The data input into row [24] of PE array 1720 may be replicated, for example, by the input selector circuit, and sequentially sent to processing elements in multiple corresponding rows (e.g., rows [30] and [36] as shown in FIG. 15) in PE array 1720 to perform the fused-multiply-and-add operations.

Thus, K rows of PE array 1720 may be used during a same time period, where input data in each partition 1732 may be read once form the memory and filtered using multiple (e.g., K) filter elements. Afterward, other multiple (e.g., K) filter elements in each 2-D filter in the set of C 2-D filters may be loaded into multiple (e.g., K) rows in a corresponding column of the M columns, and data in one or more partitions 1732 may be read, replicated, and sequentially sent to processing elements in multiple corresponding rows in PE array 1720 to perform the fused-multiply-and-add operations to generate M output feature maps 1750. As such, the convolution operation may be performed faster using more rows of PE array 1720 at any given time.

Accelerator 1710 may perform instructions generated by a compiler using a neural network model, such as a ResNet-50 model. The neural network model may be represented by a data flow graph where each node (e.g., vertex) in the graph may represent an operation, and connections (e.g., edges) between the nodes may represent the data flow or data dependency. The compiler may perform shape inference on the neural network model, for example, to determine the sizes of the data used for each operation. The compiler may then traverse the data flow graph to identify operations that may not efficiently utilize the computing engines (e.g., accelerators, or more specifically, processing element arrays) of the hardware system for implementing the neural network. For example, the compiler may identify operations that use a small number of input channels, such as operations that each use no more than, for example, a half of the total number of rows in the PE array when applying one weight to each input channel.

For the identified operations, the compiler may add, to the neural network model, operations for padding the input feature map for each input channel as described above with respect to, for example, FIG. 13, based on parameters of a convolution operation, such as the size of an original input feature map, the size of a filter (e.g., kernel), the stride used for the convolution, the memory alignment, and the size of the processing element array. Optionally, the compiler may add to the neural network model operations for dividing the padded input feature map into multiple partitions and dividing the convolution operation into multiple sub-operations, where the sub-operations may use different partitions of the multiple partitions. In some embodiments, the compiler may add operations for discarding certain padded data or results generated using certain padded data.

The compiler may then map the convolution operation (e.g., the sub-operations) to the hardware system, such as the processing element array in an accelerator. The compiler may detect operations that use shifted data read from memory and share certain data with other operations, for example, by analyzing the compute loop boundary. For the detected operations, the compiler may add instructions that may be executed by, for example, the input selector circuit described above, for replicating certain data for inputting into certain rows of the processing element array. The compiler may also determine the amount of data to be discarded due to the padding, and generate instructions for execution by, for example, the accelerator, to discard certain padded data or results generated using certain padded data.

Figure 18:
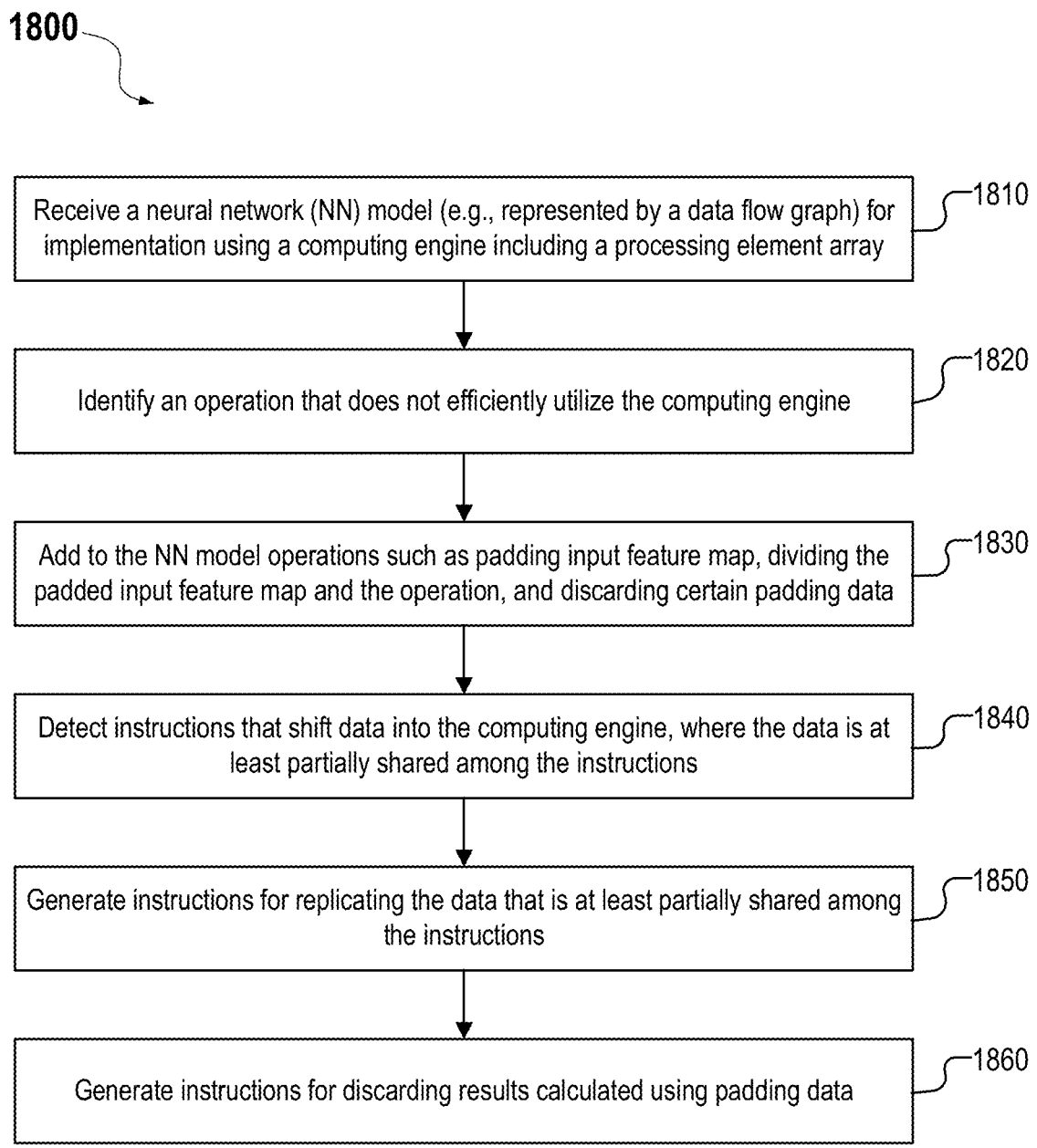
FIG. 18 is a flow chart illustrating an example of a method for more efficiently utilizing a processing element array while reducing data transferring from memory according to certain embodiments.

FIG. 18 is a flow chart illustrating an example of a method for more efficiently utilizing a processing element array while reducing data transferring from memory according to certain embodiments. Operations described in flow chart 1800 may be performed by, for example, a compiler running on a host system, such as the compiler and host system described below with respect to FIG. 19. Although flow chart 1800 may describe the operations as a sequential process, in various embodiments, many of the operations may be performed in parallel or concurrently. In addition, the order of the operations may be rearranged. A process may have additional steps not shown in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

At block 1810, a host system may receive a neural network model that includes convolution operations in different layers of a neural network. The neural network model may need to be implemented using a computing engine that may include a two-dimensional processing element array. The neural network model may be represented by a data flow graph as described above. The convolution operation may be used to generate an output tensor that includes a set of output feature maps, using a set of input feature maps and a set of filters. As described above, in some embodiments, the set of input feature maps may include C input feature maps, the set of filters may include M filters each including C filter matrices, and the set of output feature maps may include M output feature maps, where each of the M output feature maps may be the sum of the result of a convolution between each of the C input feature maps and the corresponding filter matrix in the C filter matrices in a filter of the M filters. In some embodiments, C may be much lower than the total number of rows in the two-dimensional processing element array in the computing engine. In one example, C may be 3 and the three input feature maps may include the red, green, and blue channels of a color image. The processing element array may include, for example, 64, 128, or more rows.

At block 1820, a compiler executing on a host system may detect a convolution operation that may not efficiently utilize the computing engine. For example, the compiler may traverse the data flow graph of the neural network model to identify a convolution operation that may under-utilize the computing engine for implementing the neural network. The identified operation may use a small number of input channels, such as no more than a half of the total number of rows in the PE array, when applying one filer element to each input channel of the small number of input channels. When the number of input channels is no more than a half of the total number of rows in the PE array, the convolution operation may utilize no more than a half of rows in the processing element array for applying a set of filter elements that includes one filter element in each filter of the set of filters to the set of input feature maps. For example, the number of the rows used may be equal to the number of input channels.

At block 1830, the compiler may add operations to the neutral network model, such as adding nodes to the data flow graph representing the neural network. The operations may include, for example, based on the stride (e.g., 2×2) of the convolution operation, padding the input feature map with padding data as described above with respect to FIGS. 13-15, dividing the padded input feature map into partitions as described above with respect to FIGS. 14-16, dividing the convolution operation into smaller sub-operations for operating on the partitions, and/or discarding certain padding data, such as padding data used for memory alignment. In some embodiments, the added operations may include writing the partitions into different respective memory banks in a memory device. The neural network model with the added operations may be compiled to generate instructions for executing by the computing engine that includes the two-dimensional processing element array and other circuits as described in, for example, FIG. 7, such as input selector circuit 730.

At block 1840, the compiler may detect instructions that shift data into the PE array, where the data may be at least partially shared among the instructions. For example, the compiler may identify two instructions that may include shifting a same portion of an input feature map into the PE array for multiplication with different filter elements. A first instruction in the two instructions may include shifting a first portion of the input feature map into the PE array to multiply with a first filter element of a filter, a second instruction in the two instructions may include shifting a second portion of the input feature map into the PE array to multiply with a second filter element of the filter, and there may be some overlap between the first portion and the second portion of the input feature map. The first instruction and the second instruction may potentially be executed at the same time by two rows of the PE array, where one instruction may use the data used by the other instruction.

At block 1850, the compiler may generate instructions for replicating the data that may be shared among the instructions. For example, the data used by the first instruction may be read from a memory and shifted into a first row that is loaded with the first filter element in the PE array, while the data used by the second instruction may be replicated by an input selector circuit based on the data read from the memory and used by the first instruction. In some embodiments, the input selector circuit may delay the replicated data by a certain number of clock cycles before sending the replicated data into a second row that is loaded with the second filter element in the PE array. In some embodiment, the instructions for replicating the data may include instructions for activating the input selector circuit at a time after the data read from the memory is input to the first row.

Optionally, at block 1860, the compiler may generate instructions for discarding results calculated using certain padding data. For example, some data shifted into the first row in the PE array may not be needed by the first row but may be replicated for use by the second row. Thus, the computation results calculated by the first row using the padding data may be discarded (e.g., not added to the sum of the products).

Figure 19:
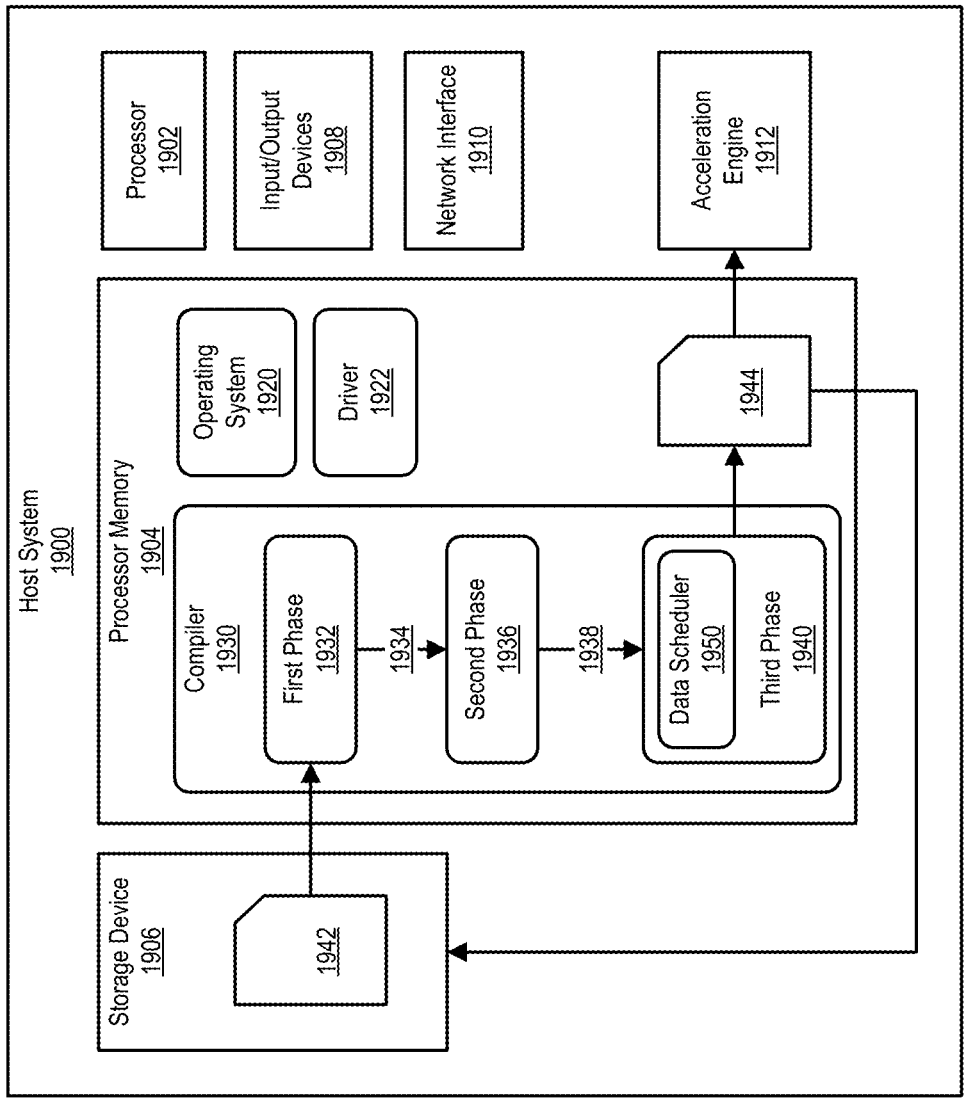
FIG. 19 includes a block diagram of an example of a host system.

FIG. 19 includes a block diagram illustrating an example of a host system 1900 on which a compiler 1930, such as is described herein, can run. The illustrated host system 1900 is an example of a computing device, and includes a processor 1902, a processor memory 1904, at least one storage device 1906, various Input/Output (I/O) devices 1908, and at least one network interface 1910. In the example of FIG. 19, the host system 1900 also includes an acceleration engine 1912, which is an integrated circuit device that can accelerate certain operations or computations performed by the host system 1900. In various examples, the host system 1900 can be implemented as a server in a data center, a desktop computer, a laptop computer, a tablet computer, or a smartphone, among other examples. In some examples, operations or components discussed below as performed or included in the host system 1900 can be performed or included in other computer devices. For example, the compiler 1930 can execute on the host system 1900 while the acceleration engine 1912 is located at a different host system.

The processor 1902 is an integrated circuit device that can execute program code, in the form of instructions. The program code can be for various software applications or tools, such as an operating system 1920 or the illustrated compiler 1930. While the processor 1902 is executing a program, the instructions for the program can be stored in the processor memory 1904. The instructions can also be stored elsewhere, such as on the storage device 1906, and can be loaded into the processor memory 1904 when needed by the processor 1902. The processor 1902 can also use the processor memory 1904 for temporary storage of other data on which the processor 1902 is operating. In various examples, the processor memory 1904 is a volatile memory type, such as a type of Random Access Memory, though non-volatile memory types can, alternatively or additionally, be used for the processor memory 1904.

The storage device 1906 is an example of a device that can include non-volatile memory. For example, the storage device 1906 can be a magnetic disk drive, a solid state drive, or an optical drive, among other examples. The storage device 1906 can further be non-transitory, such that program code and other data stored on the storage device 1906 remains present when the storage device 1906 is not powered on.

The storage device 1906 is one example of a peripheral device, which are components that can be coupled to the host system 1900 to add functionality to the host system 1900. Other examples of peripheral devices include the Input/Output devices 1908 and the network interface 1910. The Input/Output devices 1908 can include user input and output devices, such as keyboards, mice, touch screens, microphones, display screens, speakers, printers, and scanners, among other examples. The network interface 1910, which can be implemented using a network interface card, can provide access to one or more networks. The network interface 1910 can include, for example, a physical port for connecting a network cable and/or wireless antennas for communicating with Wi-Fi and/or cellular networks. The network interface 1910 can also be described as an I/O device.

The acceleration engine 1912 is also another type of peripheral device or I/O device. The acceleration engine 1912 is a device that is purpose built to perform certain operations that can be performed by the processor 1902, but can be performed faster by the acceleration engine 1912. For example, the acceleration engine 1912 can be a neural network accelerator, and, as such, may be able to perform the large scale, parallel computations of a neural network more efficiently than when the computations are performed by the processor 1902. As another example, the acceleration engine 1912 can be a graphics processing unit (GPU), and may be optimized to perform the computations needed for graphics rendering. Other examples of devices that can be implemented by the acceleration engine 1912 include cryptographic accelerators, compression and decompression accelerators, 3-D accelerators, regular expression accelerators, security accelerators, and others.

In various examples, the acceleration engine 1912 can execute program code to perform certain operations. For example, when the acceleration engine 1912 is a neural network accelerator, the acceleration engine 1912 can be programmed to execute a particular neural network, such as one that performs image recognition or one that performs machine translation. As a further example, to support the execution of a neural network, the acceleration engine 1912 can be programed to perform operations such as copying data for the neural network from processor memory 1904 (for example) into the acceleration engine 1912, copying input data for the neural network from processor memory 1904 into the acceleration engine 1912, and/or copying results from the acceleration engine 1912 into the processor memory 1904, among other examples.

To generate program code for the acceleration engine 1912, in various examples, the host system 1900 can execute the compiler 1930. Compilers, in general, are software programs that translate program code written in a human-readable language into a format (e.g., machine instructions) that can be read and processed by an integrated circuit device. In the example of FIG. 19, the acceleration engine 1912 is a neural network accelerator and the compiler 1930 is for compiling a neural network description into instructions to be executed by the acceleration engine 1912. When the acceleration engine 1912 implements a different type of accelerator, another compiler can be used. As described above, in some embodiments, the compiler 1930 can be used to divide the tensor operations into sub-operations and can schedule the performance of the sub-operations on different acceleration engines and/or different accelerators in an acceleration engine.

The compiler 1930 can be activated, for example, when the operating system 1920 receives keyboard, mouse, touch-screen, voice commands, or other inputs from the Input/Output devices 1908. The inputs can further include parameters for the compiler 1930, such as the input code 1942 to compile and configure options for the compilation process. Once the compiler 1930 is activated, the processor 1902 can load the instructions for the compiler 1930 into the processor memory 1904, and can execute the instructions.

In the example of FIG. 19, the compiler 1930 includes a first stage 1932, a second stage 1936, and a third stage 1940, which each perform different operations to produce compiled code 1944. In other examples, the compiler 1930 can combine the operations of the first stage 1932, second stage 1936, and/or third stage 1940 into fewer stages, or can divide the operations of one of the stages into multiple stages.

The first stage 1932 can receive and process input code 1942. The input code 1942 can describe a program in a high-level programming language, such as Java, C++, or Tensorflow, among many other examples. The input code 1942 can describe, for example, steps to perform image recognition, speech recognition, machine translation, or other operations. The input code 1942 can be obtained, for example, from the storage device 1906. Alternatively, though not illustrated here, the input code 1942 may be located in the processor memory 1904 or can be obtained from a network location, using the network interface 1910. Processing of the input code 1942 can include sorting the operations described in the input code 1942 into layers, where the outputs of one layer provide the inputs to a next layer. Processing can also include identifying steps to be performed by the processor 1902, rather than by the acceleration engine 1912. For example, the processor 1902, through the execution of a driver 1922, may need to perform steps such as configuring Direct Memory Access (DMA) descriptors for moving data into or out of the acceleration engine 1912, among other examples.

The output 1934 of the first stage 1932 can be organized, for example, in the layers, nodes, and connections between nodes of a neural network. The second stage 1936 can perform intermediate processing on this output 1934. For example, the operations performed in any one layer, or at any one node in a layer, may be too many for the acceleration engine 1912 to perform at the same time. The acceleration engine 1912 may, for example, have a limited amount of locale storage space for the data needed for a computation, or the computations may be more than the acceleration engine 1912 can perform at one time. In this example, the first stage 1932 can break the operations of the layer or node down into smaller operations, which can fit into the acceleration engine's local memory and/or can fit into the computing capacity of the acceleration engine 1912. Processing of the output 1934 of the first stage 1932 can include other steps, such as scheduling, or determining the order in which the acceleration engine 1912 and/or processor 1902 will perform operations, among other examples.

In various examples, the output 1938 of the second stage 1936 includes the various steps to be performed by components of the acceleration engine 1912, in the order that the steps are to be performed. The output 1938 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 1940 can operate on the output 1938 of the second stage 1936, and perform various steps before producing the instructions that are to be executed by the acceleration engine 1912. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 1940 can include a data scheduler 1950.

The output of the third stage 1940 is compiled code 1944, which may include machine instructions in binary format. In some examples, the compiled code 1944 can be stored in the processor memory 1904. Alternatively or additionally, the compiled code 1944 can be copied to the storage device 1906 or to a network location. As noted above, the acceleration engine 1912 may be located at a different host system, in which case the compiled code 1944 can be sent over the network interface 1910 to the other host system.

In the example of FIG. 19, the host system 1900 can be executing a driver 1922, which can also be referred to as a device driver or runtime driver, that manages the acceleration engine 1912. The driver 1922 can provide an interface between applications executing on the host system 1900 (or on another host system) and the acceleration engine 1912. For example, the driver 1922 can provide an Application Program Interface (API) that defines functions for feeding input data to the acceleration engine 1912 and defining the operation to perform on the input data. In this and other examples, the driver 1922 can configure the acceleration engine 1912 to perform the operation. For example, the driver 1922 can identify a neural network that the acceleration engine 1912 is to execute, as well as the location in the processor memory 1904 or on the storage device 1906 where the compiled code 1944 for the neural network is located. The driver 1922 can further load into the acceleration engine 1912 or cause the acceleration engine 1912 to load the compiled code 1944, can load or cause the acceleration engine 1912 to load the input data on which the neural network is to operate, and/or can cause the acceleration engine 1912 to being executing on the input data. Once the acceleration engine 1912 has finished, the acceleration engine 1912 can notify the driver 1922, and the driver 1922 can deliver a result back to the application that requested the result.

Figure 20:
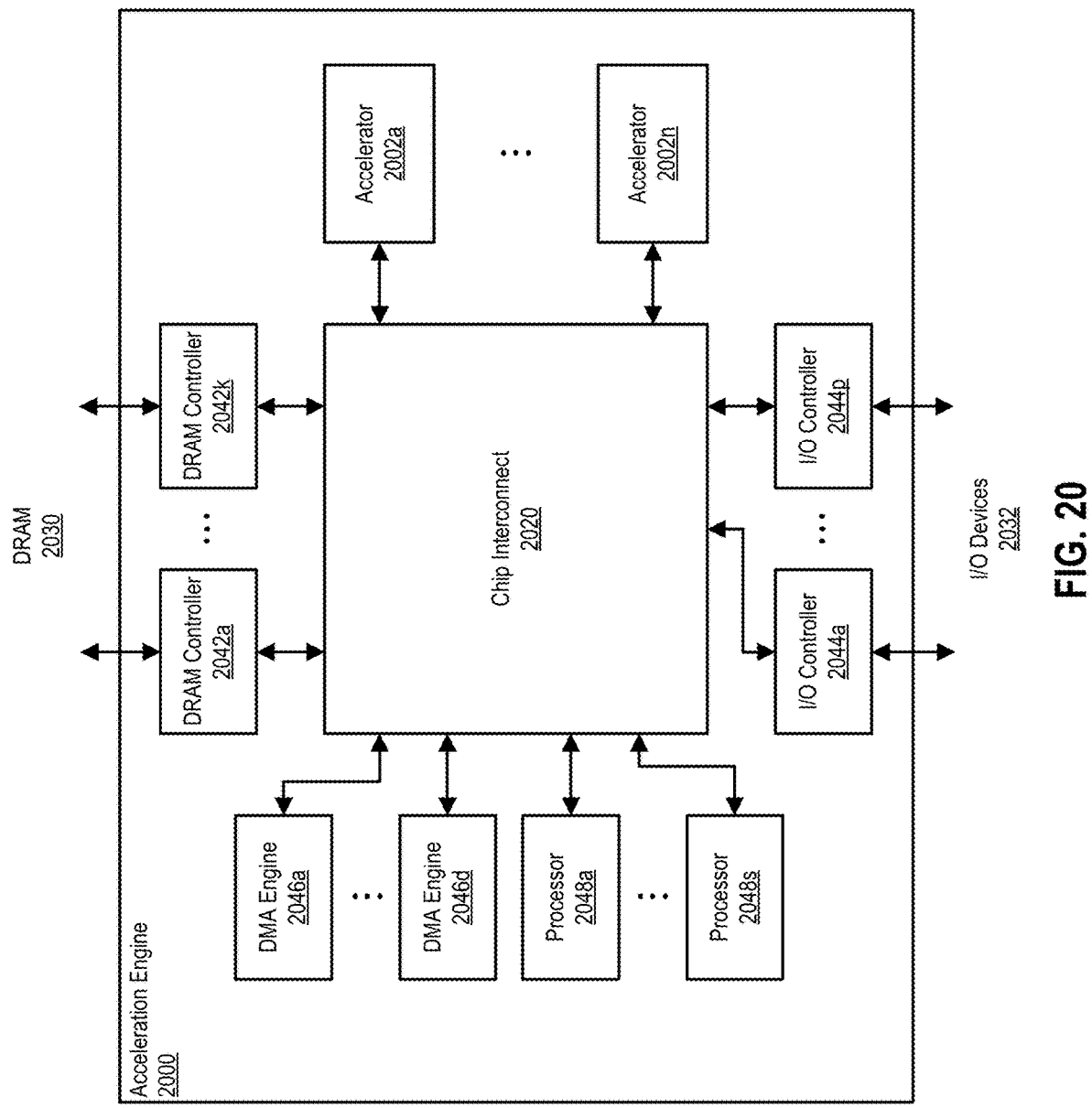
FIG. 20 includes a block diagram of an example of an acceleration engine.

FIG. 20 includes a block diagram that illustrates an example of an acceleration engine 2000. The acceleration engine 2000 is an example of an integrated circuit that can include one or more accelerators 2002*a*-2002*n* that may be similar to the accelerator described above with respect to, for example, FIG. 7. For example, in one embodiment, the acceleration engine 2000 may include four accelerators that may be used to perform four sub-operations of a convolution operation in parallel as described above.

In the example of FIG. 20, the acceleration engine 2000 includes multiple accelerators 2002*a*-2002*n*, each of which can perform a set of operations. In various examples, the accelerators 2002*a*-2002*n* are for particular types of operations, so that the accelerators 2002*a*-2002*n* can perform the operations much faster than when similar operations are performed by a general purpose processor. In various examples, to perform a set of operations, input data on which the operations are to be performed must first be moved into the accelerators 2002*a*-2002*n*. Additionally, in some cases, program code is also moved into the accelerators 2002*a*-2002*n*, which programs the operations that the accelerators 2002*a*-2002*n* will perform on the data. In the illustrated example, the acceleration engine 2000 includes N accelerators 2002*a*-2002*n*. Examples of accelerators that can be included in the acceleration engine 2000 include graphics accelerators, floating point accelerators, neural network accelerators, and others. In various examples, the accelerators 2002*a*-2002*n* can each be the same (e.g., each of the is a graphics accelerator) or can be different (e.g., the accelerators 2002*a*-2002*n* include a graphics accelerator, a floating point accelerator, and neural network accelerator).

The example acceleration engine 2000 further includes DRAM controllers 2042*a*-2042*k* for communicating with an external memory. The external memory is implemented, in this example, using DRAM 2030. In the illustrated example, the acceleration engine 2000 includes K DRAM controllers 2042*a*-2042*k*, each of which may be able to communicate with an independent set of banks of DRAM. In other examples, other types of RAM technology can be used for the external memory. The DRAM controllers 2042*a*-2042*k* can also be referred to as memory controllers.

In various examples, input data and/or program code for the accelerators 2002*a*-2002*n* can be stored in the DRAM 2030. Different programs can cause the accelerators 2002*a*-2002*n* to perform different operations. For example, when one of the accelerators is a neural network accelerator, one program can configure the neural network accelerator to perform speech recognition while another program can configure the neural network accelerator to perform image recognition. In various examples, different accelerators 2002*a*-2002*n* can be programmed with different programs, so that each performs a different set of operations. In various examples, the processors 2048*a*-2048*s* can manage moving of program code from the DRAM 2030 to the accelerators 2002*a*-2002*n*.

The example acceleration engine 2000 further includes I/O controllers 2044*a*-2044*p* for communicating with I/O devices 2032 in the system. The acceleration engine 2000 can communicate with I/O devices over, for example, a processor bus. In some examples, the processor bus can be implemented using Peripheral Component Interconnect (PCI) and/or a variation of the PCI bus protocol. The processor bus can connect the acceleration engine 2000 to I/O devices such as, for example, input and output devices, memory controllers, storage devices, and/or network interface cards, among other things. In some examples, the I/O controllers 2044*a*-2044*p* can enable the acceleration engine 2000 to act as an I/O device for a host processor. For example, the acceleration engine 2000 can be the recipient of input data from the host processor, and a command indicating an operation to be performed on the input data (e.g., a particular computation or analysis). In the illustrated example, the acceleration engine 2000 includes p I/O controllers 2044*a*-2044*p*, each of which may include a separate root complex and may communicate with a separate set of I/O devices 2032. In other examples, other standardized bus protocols, such as Ultra Path Interconnect (UPI) can be used for the host bus. In other examples, a proprietary bus protocol can be used.

Movement of data in the acceleration engine 2000 can be managed by one or more processors 2048*a*-2048*s*, which can also be referred to as data management processors. In the example of FIG. 20, the acceleration engine 2000 includes s processors 2048*a*-2048*s* incorporated into the device (e.g., on the same silicon die). In other examples, the processors 2048*a*-2048*s* can be external to the acceleration engine 2000 (e.g., on a different die and/or in a different package). In some examples, the processors 2048a-2048s can manage the movement of data from I/O devices 2032 to the accelerators 2002a-2002n or the DRAM 2030. For example, input data may be located at an I/O device 2032 or in processor memory, and the processors 2048a-2048s can move the input from the I/O device 2032 or processor memory into an accelerator or into DRAM 2030. As another example, program code for the accelerators 2002a-2002n may be located on an I/O device 2032 or in processor memory.

The example acceleration engine 2000 further includes DMA engines 2046a-2046d that can move data between the accelerators 2002a-2002n, DRAM controllers 2042a-2042k, and I/O controllers 2044a-2044p. In the illustrated example, the acceleration engine 2000 includes D DMA engines 2046a-2046d. In some implementations, the DMA engines 2046a-2046d can be assigned to specific tasks, such as moving data from the DRAM controllers 2042a-2042d to the accelerators 2002a-2002n, or moving data between the I/O controllers 2044a-2044p and the accelerators 2002a-2002n. These tasks can be assigned, for example, by enqueuing descriptors with the DMA engines 2046a-2046d, where a descriptor identifies an address for a block of data and an operation (e.g., a read or a write) to perform. A descriptor, for example, can direct a DMA engine to instruct a DMA controller to read a block of data from DRAM 2030. A descriptor can, as a further example, instruct the DMA engine to write data, read by the DMA controller, to an accelerator. Further descriptors can be used to move data from an accelerator to DRAM 2030.

In various examples, each of the processors 2048a-2048s can be responsible for managing the data movement for a different accelerator. In some examples, a processor may manage the data movement for more than one accelerator. Similarly, in various examples, each of the processors 2048a-2048s can be assigned to one or more DMA engines 2046a-2046d. In these and other examples, associations between processors 2048a-2048s, accelerators 2002a-2002n, and DMA engines 2046a-2046d are determined by program code being executed by each respective processor.

In the example acceleration engine 2000, the various components can communicate over a chip interconnect 2020. The chip interconnect 2020 primarily includes wiring for routing data between the components of the acceleration engine 2000. In some cases, the chip interconnect 2020 can include a minimal amount of logic, such as multiplexors to control the direction of data, flip-flops for handling clock domain crossings, and timing logic.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method performed by one or more processors of a computer system, the computer-implemented method comprising:
   determining, by a compiler executing on the one or more processors and as part of generating instructions for programming a processing element array to implement a convolution operation in a neural network, that the convolution operation under-utilizes the processing element array, wherein:
      the convolution operation involves using the processing element array to perform a series of matrix multiplications between a set of filters and a set of input matrices, each filter in the set of filters comprises a weight matrix to be multiplied with a respective input matrix in the set of input matrices, each input matrix is assigned to a respective row in the processing element array, and determining that the convolution operation under-utilizes the processing element array comprises detecting that less than a threshold number of rows in the processing element array would be used concurrently; and adding, by the compiler in response to determining that the convolution operation under-utilizes the processing element array, instructions for modifying the convolution operation to increase the number of rows used concurrently, wherein the added instructions are executable to cause a first input matrix to be processed in parallel across a plurality of rows, the plurality of rows having at least one additional row compared to when the first input matrix is processed without modifying the convolution operation.

2. The computer-implemented method of claim 1, wherein the added instructions are configured to increase the number of rows for a plurality of input matrices.

3. The computer-implemented method of claim 1, wherein the added instructions include instructions for:
loading different filter elements from a first filter into the plurality of rows; and
replicating the first input matrix at least once across the plurality of rows.

4. The computer-implemented method of claim 1, wherein the added instructions include instructions for:
padding the first input matrix using padding data, such that each row of the plurality of rows receives a same number of input elements for processing.

5. The computer-implemented method of claim 4, wherein the padding data for a first row of the plurality of rows comprises data values from the first input matrix, and wherein the data values from the first input matrix are replicated as non-padding data for a second row subsequent to the first row.

6. The computer-implemented method of claim 4, wherein the padding data includes data used for memory alignment, and wherein the added instructions include instructions for discarding results computed from the data used for memory alignment.

7. The computer-implemented method of claim 1, wherein the added instructions include instructions for:
loading a first filter element from a first filter into a first row of the plurality of rows;
loading a second filter element from the first filter into a second row of the plurality of rows;
dividing the first input matrix into at least a first partition and a second partition;
inputting the first partition to the first row for processing using the first filter element; and
inputting the second partition to the second row for processing using the second filter element, in parallel with the processing of the first partition.

8. The computer-implemented method of claim 7, wherein the inputting of the first partition and the second partition comprises:
reading the first partition and the second partition from respective memory locations;
forming a first sequential stream of input elements corresponding to the first partition; and
forming a second sequential stream of input elements corresponding to the second partition.

9. The computer-implemented method of claim 7, wherein the added instructions include instructions for:
loading a third filter element from the first filter into a third row of the plurality of rows; and
replicating the first partition to form input to the third row, wherein input elements of the third row are data shifted relative to input elements of the first row.

10. A computer system, comprising:
a processing element array;
one or more processors separate from the processing element array; and
a memory subsystem storing a compiler, the compiler being executable by the one or more processors to generate instructions for programming the processing element array to implement a convolution operation in a neural network, wherein:
the convolution operation involves using the processing element array to perform a series of matrix multiplications between a set of filters and a set of input matrices,
each filter in the set of filters comprises a weight matrix to be multiplied with a respective input matrix in the set of input matrices, and
each input matrix is assigned to a respective row in the processing element array; and
wherein the compiler is configured to generate the instructions for programming the processing element array through:
determining that the convolution operation under-utilizes the processing element array, based on detecting that less than a threshold number of rows in the processing element array would be used concurrently, and
responsive to determining that the convolution operation under-utilizes the processing element array, adding instructions for modifying the convolution operation to increase the number of rows used concurrently, wherein the added instructions are executable to cause a first input matrix to be processed in parallel across a plurality of rows, the plurality of rows having at least one additional row compared to when the first input matrix is processed without modifying the convolution operation.

11. The computer system of claim 10, wherein the added instructions are configured to increase the number of rows for a plurality of input matrices.

12. The computer system of claim 10, wherein the added instructions include instructions for:
loading different filter elements from a first filter into the plurality of rows; and
replicating the first input matrix at least once across the plurality of rows.

13. The computer system of claim 10, wherein the added instructions include instructions for:
padding the first input matrix using padding data, such that each row of the plurality of rows receives a same number of input elements for processing.

14. The computer system of claim 13, wherein the padding data for a first row of the plurality of rows comprises data values from the first input matrix, and wherein the data values from the first input matrix are replicated as non-padding data for a second row subsequent to the first row.

15. The computer system of claim 13, wherein the padding data includes data used for memory alignment, and wherein the added instructions include instructions for discarding results computed from the data used for memory alignment.

16. The computer system of claim 10, wherein the added instructions include instructions for:
- loading a first filter element from a first filter into a first row of the plurality of rows;
- loading a second filter element from the first filter into a second row of the plurality of rows;
- dividing the first input matrix into at least a first partition and a second partition;
- inputting the first partition to the first row for processing using the first filter element; and
- inputting the second partition to the second row for processing using the second filter element, in parallel with the processing of the first partition.

17. The computer system of claim 16, wherein the inputting of the first partition and the second partition comprises:
- reading the first partition and the second partition from respective memory locations;
- forming a first sequential stream of input elements corresponding to the first partition; and
- forming a second sequential stream of input elements corresponding to the second partition.

18. The computer system of claim 16, wherein the added instructions include instructions for:
- loading a third filter element from the first filter into a third row of the plurality of rows; and
- replicating the first partition to form input to the third row, wherein input elements of the third row are data shifted relative to input elements of the first row.

19. A non-transitory computer readable medium having stored therein instructions that, when executed by one or more processors, cause the one or more processors to execute a compiler, the compiler performing operations including:
- determining, as part of generating instructions for programming a processing element array to implement a convolution operation in a neural network, that the convolution operation under-utilizes the processing element array, wherein:
  - the convolution operation involves using the processing element array to perform a series of matrix multiplications between a set of filters and a set of input matrices,
  - each filter in the set of filters comprises a weight matrix to be multiplied with a respective input matrix in the set of input matrices,
  - each input matrix is assigned to a respective row in the processing element array, and
  - determining that the convolution operation under-utilizes the processing element array comprises detecting that less than a threshold number of rows in the processing element array would be used concurrently; and
- responsive to determining that the convolution operation under-utilizes the processing element array, adding instructions for modifying the convolution operation to increase the number of rows used concurrently, wherein the added instructions are executable to cause a first input matrix to be processed in parallel across a plurality of rows, the plurality of rows having at least one additional row compared to when the first input matrix is processed without modifying the convolution operation.

20. The non-transitory computer readable medium of claim 19, wherein the added instructions include instructions for:
- loading different filter elements from a first filter into the plurality of rows; and
- performing one of:
  - replicating the first input matrix at least once across the plurality of rows, or
  - partitioning the first input matrix across the plurality of rows.

* * * * *